United States Patent
Bin Kenaid

(10) Patent No.: US 9,766,340 B2
(45) Date of Patent: Sep. 19, 2017

(54) GPS CORRECTION METHOD AND SYSTEM

(71) Applicant: Salem Ali Bin Kenaid, Abu Dhabi (AE)

(72) Inventor: Salem Ali Bin Kenaid, Abu Dhabi (AE)

(73) Assignee: Salem Ali Bin Kenaid, Abu Dhabi (AE)

( * ) Notice: Subject to any disclaimer, the term of this patent is extended or adjusted under 35 U.S.C. 154(b) by 110 days.

(21) Appl. No.: 14/519,177

(22) Filed: Oct. 21, 2014

(65) Prior Publication Data

US 2016/0109577 A1 Apr. 21, 2016

Related U.S. Application Data

(62) Division of application No. 14/519,164, filed on Oct. 21, 2014.

(51) Int. Cl.

| | |
|---|---|
| G08G 1/01 | (2006.01) |
| G01S 19/41 | (2010.01) |
| G01S 19/13 | (2010.01) |
| G07B 15/02 | (2011.01) |
| G06Q 20/14 | (2012.01) |
| H04W 64/00 | (2009.01) |
| H04W 40/20 | (2009.01) |
| G01S 13/00 | (2006.01) |

(52) U.S. Cl.
CPC ............. *G01S 19/13* (2013.01); *G01S 19/41* (2013.01); *G06Q 20/145* (2013.01); *G07B 15/02* (2013.01); *G08G 1/01* (2013.01); *G01S 13/00* (2013.01); *H04W 40/20* (2013.01); *H04W 64/003* (2013.01)

(58) Field of Classification Search
CPC ... H04W 40/20; H04W 64/003; H04W 92/18; G01S 13/931; G01S 17/936; G01S 13/867; G01S 2013/9325; G01S 19/41; G01S 19/13; G06Q 20/45; G07B 15/02; G08G 1/01

See application file for complete search history.

(56) References Cited

U.S. PATENT DOCUMENTS

| | | | | |
|---|---|---|---|---|
| 5,491,636 | A | * | 2/1996 | Robertson ............ B63H 25/42 114/144 B |
| 2014/0036076 | A1 | * | 2/2014 | Nerayoff ............... H04N 7/181 348/148 |

* cited by examiner

*Primary Examiner* — Jelani Smith
(74) *Attorney, Agent, or Firm* — Snyder, Clark, Lesch & Chung, LLP

(57) ABSTRACT

GPS correction method comprising providing benchmark GPS devices located respectively at a priori known stationary benchmark points within respective geographical zones, the stationary benchmark points having corresponding benchmark GPS coordinates; providing a benchmark database storing data mapping the GPS devices to the benchmark GPS coordinates of their respective stationary benchmark points and their respective geographical zones; receiving first GPS coordinates associated to objects within the geographical zones and second GPS coordinates associated to the stationary benchmark points measured at a same time period, the first GPS coordinates being transmitted by the benchmark GPS devices and the second GPS coordinates being transmitted by GPS devices associated to the objects; and generating corrected GPS coordinates of the object by measuring a deviation between the benchmark GPS coordinates and the second GPS coordinates and using the deviation for correcting the first GPS coordinates. There is also provided a GPS correction system.

12 Claims, 25 Drawing Sheets

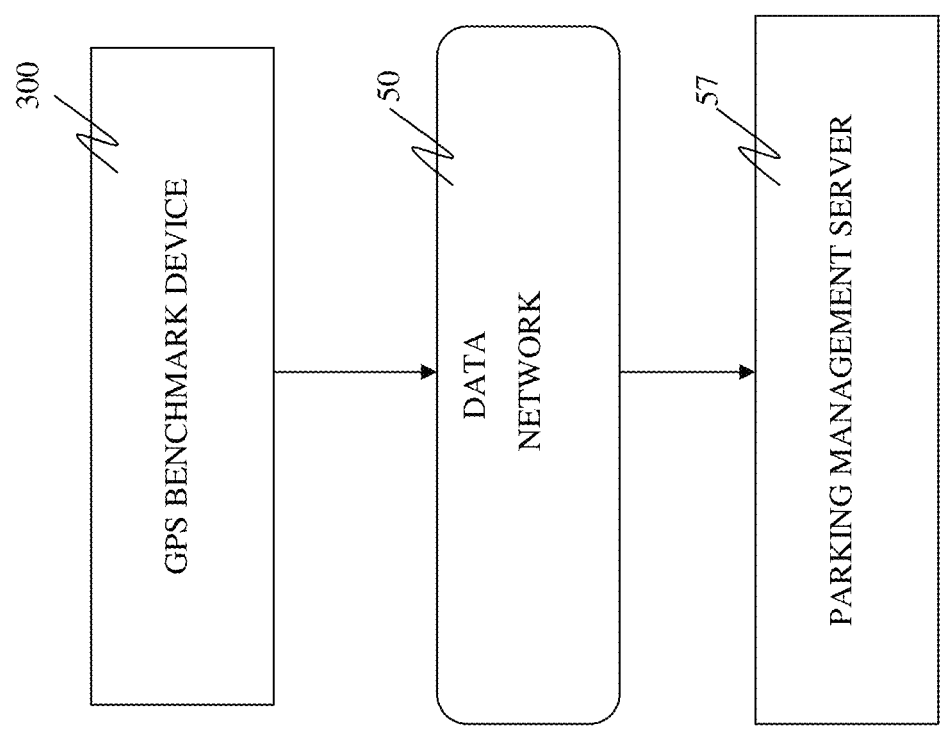

GPS CORRECTION METHOD AND SYSTEM

This application is a divisional of and claims priority under 35 U.S.C. §120 to, commonly owned U.S. patent application Ser. No. 14/519,164, filed on Oct. 21, 2014, which is incorporated herein by reference in its entirety. This application is related to, commonly owned U.S. patent application Ser. Nos. 14/519,172, 14/519,173, 14/519,175 and 14/519,178, each of which was filed on Oct. 21, 2014, and each of which is incorporated herein by reference in its entirety.

FIELD OF THE INVENTION

The present invention relates generally to the improvement of GPS positioning of moving or stationary objects, such as vehicles, and more particularly to a GPS correction system and method.

BACKGROUND OF THE INVENTION

Parking fees and parking fines (penalties) charged to vehicles by traffic control authorities are an important and widespread revenue stream for traffic authorities. Traditional parking payment systems require users to manually pay the parking tariffs for parking vehicles. Manual parking systems are usually vulnerable to the forgetfulness and laziness of vehicle owners in paying their parking tariffs, which causes loss of revenue to the traffic authorities and/or fines being issued to the vehicle owners. The issuance of fines by the traffic authorizes also require manual inspections by traffic officers which is a costly operation and subject to human error. This causes loss of revenue which could be generated from the fines.

SUMMARY OF THE INVENTION

In order to overcome the above mentioned drawbacks, there is provided an automated vehicle parking payment system.

As a first aspect of the invention, there is provided a GPS correction system comprising:
- a benchmark GPS device located at a priori known stationary benchmark point within a geographical zone, the stationary benchmark point having corresponding benchmark GPS coordinates;
- a benchmark database storing the benchmark GPS coordinates;
- a GPS deviation determination unit adapted to be connected to a data network for receiving first GPS coordinates associated to an object having a GPS device within the geographical zone and second GPS coordinates associated to the stationary benchmark point, the first and second GPS coordinates being measured at a same time period and transmitted respectively by the benchmark GPS device and the GPS device of the object and for measuring a GPS coordinates deviation between the benchmark GPS coordinates and the second GPS coordinates; and
- a GPS coordinates deviation database connected the GPS deviation determination unit for storing the GPS coordinates deviation.

As a further aspect of the invention, there is provided a GPS correction method comprising:
- providing benchmark GPS devices located respectively at a priori known stationary benchmark points within respective geographical zones, the stationary benchmark points having corresponding benchmark GPS coordinates;
- providing a benchmark database storing data mapping the GPS devices to the benchmark GPS coordinates of their respective stationary benchmark points and their respective geographical zones;
- receiving first GPS coordinates associated to objects within the geographical zones and second GPS coordinates associated to the stationary benchmark points measured at a same time period, the first GPS coordinates being transmitted by the benchmark GPS devices and the second GPS coordinates being transmitted by GPS devices associated to the objects; and
- generating corrected GPS coordinates of the object by measuring a deviation between the benchmark GPS coordinates and the second GPS coordinates and using the deviation for correcting the first GPS coordinates.

Preferably, the GPS correction system further comprises a GPS correction unit adapted to be connected to the GPS coordinates deviation database for generating corrected GPS coordinates of the object by using the determined GPS coordinates deviation.

Preferably, the deviation is measured by determining a deviation in the latitude coordinates and a deviation in the longitude coordinates respectively between the latitude coordinates and the longitude coordinates of the benchmark GPS coordinates and second GPS coordinates.

Preferably, the deviation in the latitude coordinates and the deviation in the longitude coordinates are used respectively to correct the latitude coordinates and the longitude coordinates of the first GPS coordinates associated to the object.

Preferably, the GPS correction system further comprises a zone determination unit and a geographical zones database comprising data mapping GPS coordinates to geographical zones, the zone determination unit being connected to the geographical zones database and to the communication unit for receiving the first GPS coordinates and for determining the geographical zone based on the first GPS coordinates.

Preferably, the GPS correction system further comprises an object location database for storing data mapping an object identifier to the geographical zone.

Preferably, the GPS correction system further comprises a zone validation unit connected to the zone determination unit, to the GPS correction unit and to the geographical zones databases, the zone validation unit receiving the corrected GPS coordinates of the object and validating the geographical zone based on the corrected GPS coordinates, and if it is required, the zone validation unit determining a corrected geographical zone by inquiring the geographical zones database using the corrected GPS coordinates and updating the object location database by substituting the geographical zone by the corrected geographical zone.

Preferably, the object is a vehicle, the geographical zone is a parking zone, the object location database is a vehicle location database and the object identifier is vehicle identification information.

Preferably, the first GPS coordinates of the vehicle are received by the communication unit as part of a parking notification associated to the vehicle further comprising the vehicle identification information.

Preferably, the data network comprises a satellite network.

BRIEF DESCRIPTION OF THE DRAWINGS

FIG. 22 illustrates a GPS benchmark device in connection with the parking management server as part of the parking management system in accordance with an embodiment of the invention;

DETAILED DESCRIPTION OF THE INVENTION

Vehicle Parking Management Device

As a first aspect of the invention, there is provided a vehicle parking management device 10 adapted to be mounted at a vehicle, such as a car, a motorcycle, and the like. The device 10 is adapted to detect the status of the vehicle to determine whether the vehicle is in a parking position, determine the location of the vehicle and send a parking notification to a remote parking server whenever the vehicle is determined to be in a parking position. The device 10 is adapted to operate automatically without human interaction in order to determine whether the vehicle is in a parking position, determine the location of the vehicle at that specific parking position, and to send the parking notification to the remote parking server (not shown). The remote parking server is normally managed by traffic control authorities or a private entity in contractual relationship with the traffic control authorities.

The parking notification sent by the device 10 would comprise information allowing for the identification of the vehicle and the location of the vehicle where it is parked. The information allowing for the identification of the vehicle can be for example the plate number, but it can also be an identifier which would allow the remote parking server to identify the vehicle. In this latter case, the remote parking server can have stored data allowing for mapping identifiers to vehicles and/or vehicles owners. The location information of the vehicle can be the GPS coordinates of the vehicle for example if a GPS is used to locate the vehicle. The location of the vehicle can also be determined using other tracking technologies, such as a triangulation technique using a mobile network. In the latter case, a SIM module/Chip can be used as part of the device 10 to communicate with the mobile network for the determination of the location of the vehicle at the time of parking. The parking notification is received by the remote parking server which is subsequently used for parking management purposes, such as parking payment, payment monitoring, fine issuance and the like.

Figure 1:
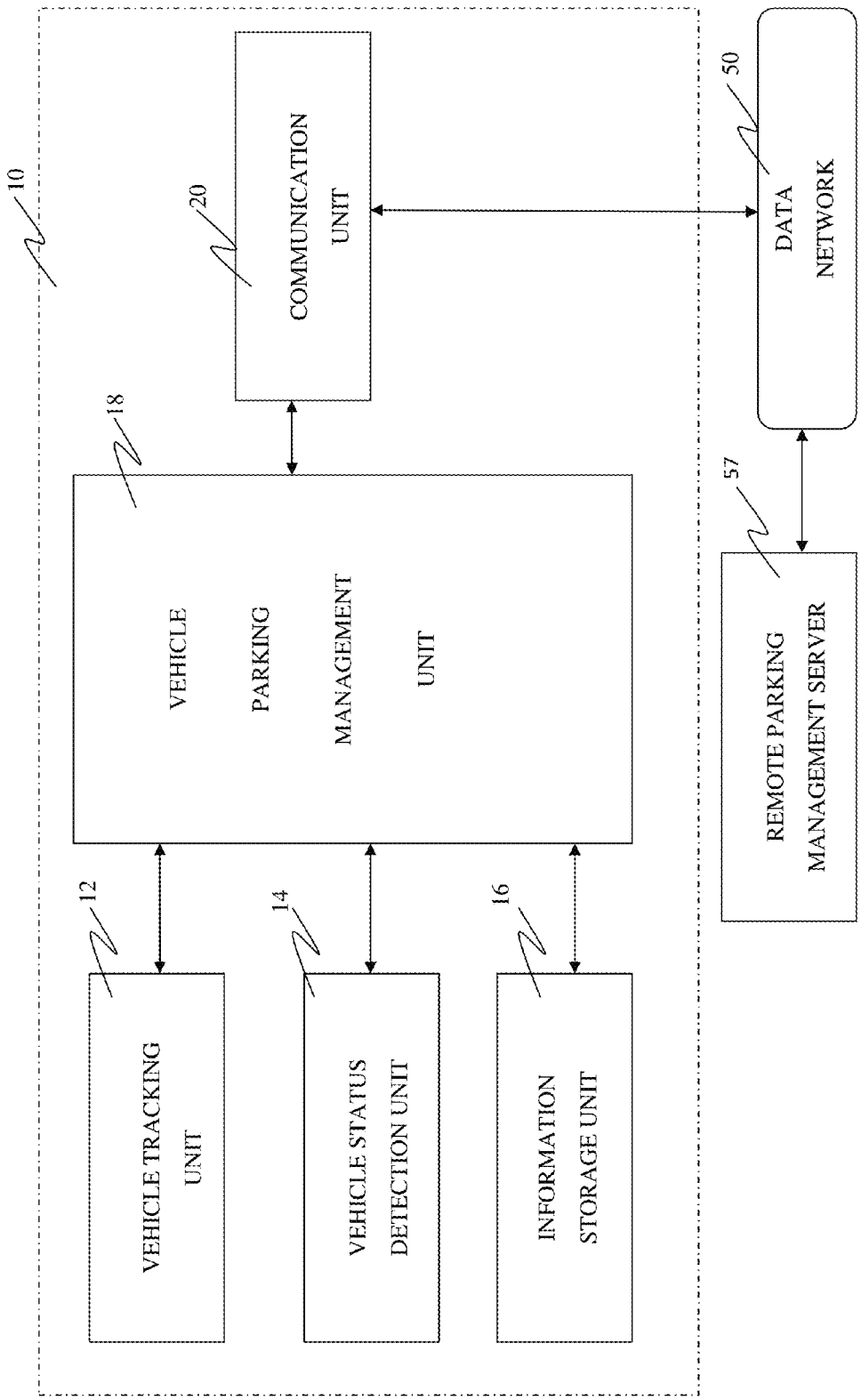
FIG. 1 illustrates a vehicle parking management device in accordance with an embodiment of the invention.

In an embodiment of the invention, the vehicle parking management device 10 comprises a vehicle tracking unit 12, a vehicle status detection unit 14, an information storage unit 16, a vehicle parking management unit 18 and a communication unit 20 (see FIG. 1).

The vehicle tracking unit 12 is adapted to determine the physical location of the vehicle and to send it to the vehicle parking management unit 18. The vehicle tracking unit 12 is adapted to be connected to the vehicle parking management unit 18 for transmitting thereto the physical location of the vehicle. In an embodiment of the invention, the vehicle tracking unit 12 comprises a Global Positioning System (GPS) device 22 for determining the GPS coordinates of the vehicle (see FIG. 2). The vehicle tracking unit 12 can alternatively comprise any type of satellite-based Global Navigation Satellite Systems (GNSS) including but not limited to a GPS navigation system. In another embodiment of the invention, the vehicle tracking unit 12 comprises a SIM chip module/Chip 30 which communicates with a mobile network 52 for determining the location of the vehicle using mobile technologies such as the triangulation technique (see FIG. 3). These mobile technologies are generally provided by the mobile network service provider. In this latter case, the SIM module/Chip 30 has a SIM module/Chip unique identifier which can be used as an identifier of the vehicle. The SIM module/Chip identifier can for example be a phone number or a Mobile Station International Subscriber Directory Number (MSISDN) identifier or an International Mobile Subscriber Identity (IMSI). The remote parking management server 57 can comprise in this case a database storing data mapping SIM module/Chip identifiers to vehicle identifying information such as vehicle plate numbers, vehicle owner identities, vehicle registration numbers and the like. The vehicle identifying information can be any type of information used by the traffic authorities to identify vehicles.

The vehicle status detection unit 14 is adapted to determine whether the vehicle is in a parking position. There are different techniques which can be used to determine such a parking position. In an embodiment of the invention, the vehicle status detection unit 14 comprises a movement detector 24 for detecting when the vehicle is in a stationary position (see FIG. 2). The vehicle status detection unit 14 uses this information to determine whether the vehicle is in a parking position. For example, the vehicle status detection unit 14 can be configured to conclude that the vehicle is in a parking position if the latter has been detected to be in a stationary position for a certain period of time exceeding a certain threshold (for example 1 minute). The movement detector 24 can be an accelerator detector or a gyroscope for example.

In an embodiment of the invention, the vehicle status detection unit 14 is adapted to detect if the vehicle is powered off/on and to determine whether the vehicle is in a parking position based on this information. If the vehicle is powered off, the vehicle is determined to be in a parking position. The vehicle status detection unit 14 can in this case be electrically connected to the vehicle's alternator or another vehicle component for determining if the vehicle is powered on or off.

In an embodiment of the invention, the vehicle status detection unit 14 is adapted to determine if the vehicle is in a parking position based on both the movement/stationary status and the power status of the vehicle. If the vehicle is both in a stationary position and powered off, the vehicle is determined to be in a parking position.

In an embodiment of the invention, the vehicle status detection unit 14 detects if the vehicle is in a new parking position by detecting sequences of the movement status of the vehicle. For example, if the vehicle is in a stationary position after being in a movement position, the vehicle is determined to be in a new parking position. The parking position and vehicle location are deemed to remain the same until the vehicle is in movement again. As soon as the vehicle is detected to be in a stationary position after being in movement, a new parking position and vehicle location are determined.

In an embodiment of the invention, the vehicle status detection unit 14 is adapted to enable a user to manually indicate whenever the car is in a parking position. In this case, when the vehicle is parked, the conductor can indicate to the device 2 that the vehicle has been parked. The vehicle status detection unit 14 can for example comprise a user interface such as a button to enable the user to make such an indication. The user indication of the parking status will be read by the vehicle parking management unit 18 which would request the vehicle location from the vehicle tracking unit 17. The vehicle parking management unit 18 would then generate the parking notification message comprising the vehicle information and location and send it to the communication unit 20 for transmission to the remote parking management server 57 via the data network 50.

The vehicle status detection unit 14 is adapted to be connected to the vehicle parking management unit 18 to manage this information. The vehicle parking management unit 18 receives the stationary status and/or power status of the vehicle and reads the vehicle location from the vehicle tracking unit 14 when the vehicle is determined to be in a parking and/or new parking position. Preferably, in order to save energy (i.e. battery), the vehicle parking management unit 18 reads the new location of the vehicle only when the vehicle is determined to be in a new parking position (after being in movement). This is because the vehicle location would not be changed during the stationary period of the vehicle, and therefore it would be unnecessary (and from the power consumption perspective inefficient) to regularly determine the location of the vehicle while the vehicle remains in the same parking position.

The vehicle parking management unit 18 is adapted to receive information from the vehicle tracking unit 12 and the vehicle status detection unit 18 regarding the stationary/ movement/power status of the vehicle and the vehicle location respectively and prepares a parking notification message comprising the location of the vehicle whenever the vehicle is determined to be in a parking position.

The parking notification message further comprises information allowing for uniquely identifying the vehicle. For this purpose, the vehicle parking management unit 18 is connected to the information storage unit 16 which stores an identifier of the vehicle. The information storage unit 16 can be any suitable data storage means such as a computer readable memory 26 or an electronic circuit adapted to store data (see FIG. 2). The vehicle identifier can be the vehicle plate number for example, but it can also be any type of identifier allowing for uniquely identifying the vehicle and recognized by the remote parking management server 57.

In an embodiment of the present invention, the information storage unit 16 also comprises financial information which is read by the vehicle parking management unit 18 and used to process any payment required based on the application used. The parking notification message comprises in this case the financial information in addition to the vehicle location and the vehicle identifier. In an application of the present invention, the remote parking management server 57 is adapted to process payment of the parking tariff of the vehicle. In this case, the financial information is used to process such a payment. In another possible application, the remote parking management unit is adapted to determine whether the parking tariff of the vehicle has been paid and to issue a fine in case the payment tariff has not been paid. In this case, the financial information is used to pay for the fine issued by the traffic authorities. In another embodiment of the present invention, the financial information is stored at the remote parking management server 57 which is used to process any such payment of the parking tariff and/or the fine. In this case, no financial information is required to be stored at the vehicle parking management device 2.

The vehicle parking management unit 18 is connected to a communication unit 20 for transmitting the parking notification to the remote parking management server 57. The communication unit 20 is adapted to be connected to the remote parking management server 57 via a wireless data network 50. In an embodiment of the invention, the connection between the vehicle parking management device 2 and the remote parking management server 57 is a satellite connection. In this case, the communication unit 20 comprises a satellite transmitter and/or receiver for establishing the connection and communicating with the remote parking management server 57.

Figure 3:
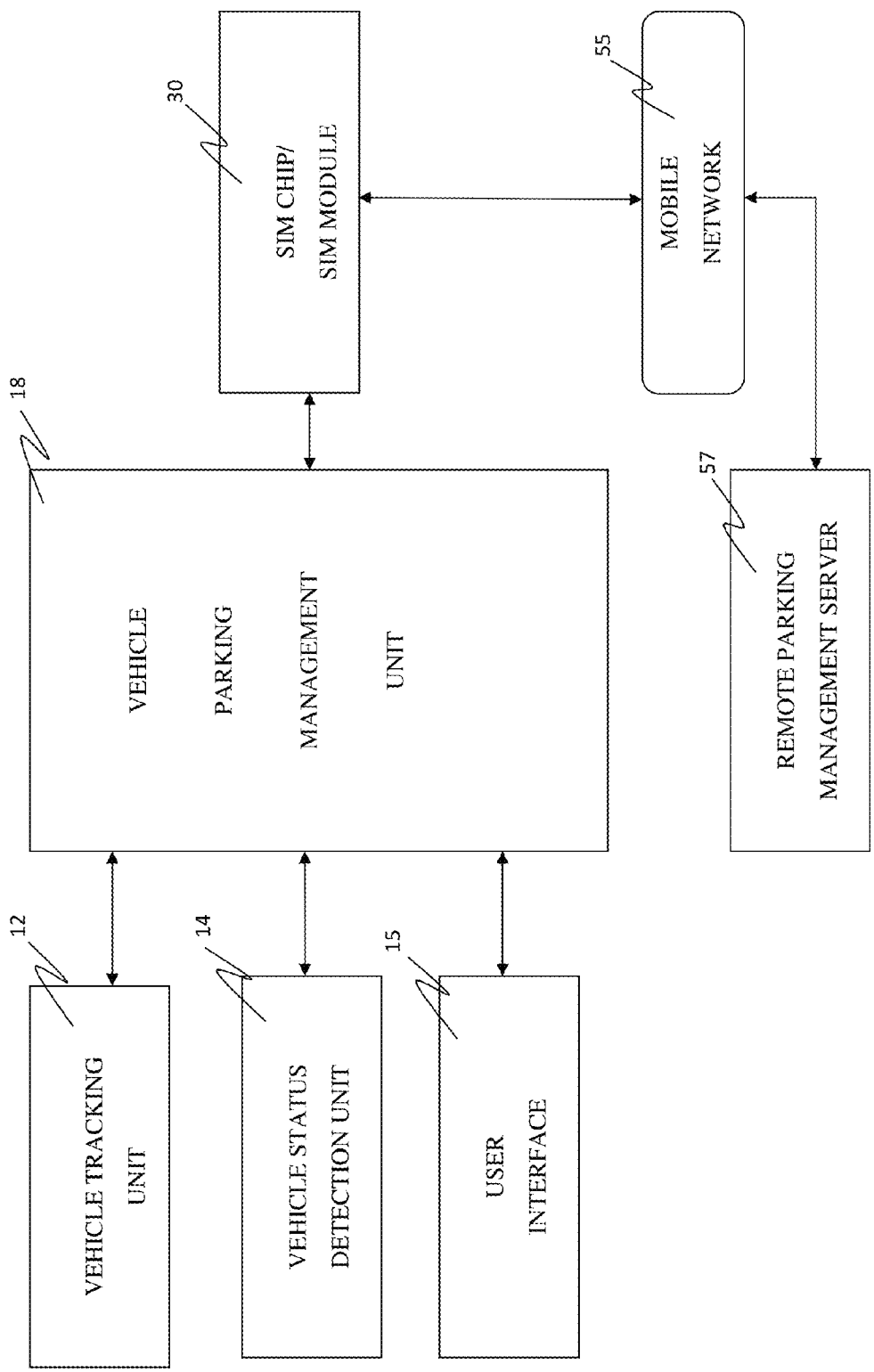
FIG. 3 illustrates a vehicle parking management device using a SIM module/chip in accordance with a further embodiment of the invention.

In another embodiment of the invention, the connection between the vehicle parking management device 2 and the remote parking management server 57 is made via a mobile data network 52 (see FIG. 3). In this case, a SIM module/Chip 30 is used to establish such a connection. In this case, the vehicle identifier can be the SIM module/Chip identifier (such as a mobile phone number or a MSISDN). The SIM module/Chip 30 can also be used in this case to store any financial information required for processing payments by the remote parking management server 57. The information storage unit 16 and the communication unit 20 can be integrated in this case within the SIM module/Chip 30.

Figure 2:
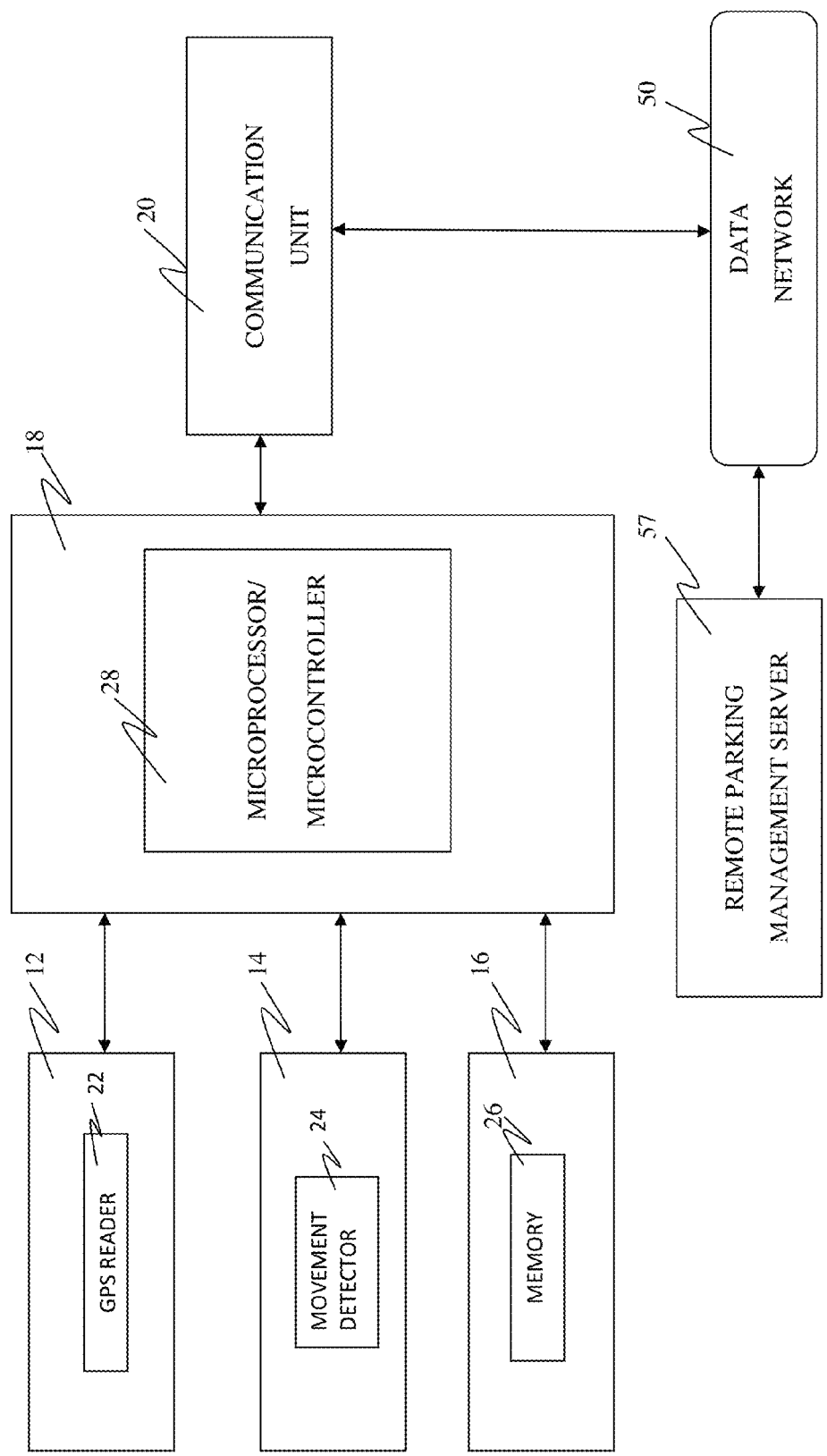
FIG. 2 illustrates a vehicle parking management device in accordance with another embodiment of the invention.

In an embodiment of the invention, the vehicle parking management unit 18 comprises a microprocessor/microcontroller 28 for processing the data received from the vehicle tracking unit 12, the vehicle status detection unit 14 and the information storage unit 16 (see FIG. 2). The microcontroller/microprocessor 28 processes the data, generates and sends the parking notification to the communication unit 20 for transmission to the remote parking management server 57 via the data network 50.

In an embodiment of the invention, the vehicle parking management device 2 comprises a user interface 15 for interacting with a user (such as the conductor of the vehicle). The user interface 15 may comprise data input means and data output means for enabling a communication between the user, the vehicle parking management unit 2 and the remote parking management server 57. The data input means can comprise a touch screen or a keyboard for example, and the data output means can comprise a display screen for example. Among others, the user interface is adapted to receive and communicate to the user data from the remote parking management server 57 such as an electronic payment receipt of a parking tariff, an electronic fine and the such.

Figure 4:
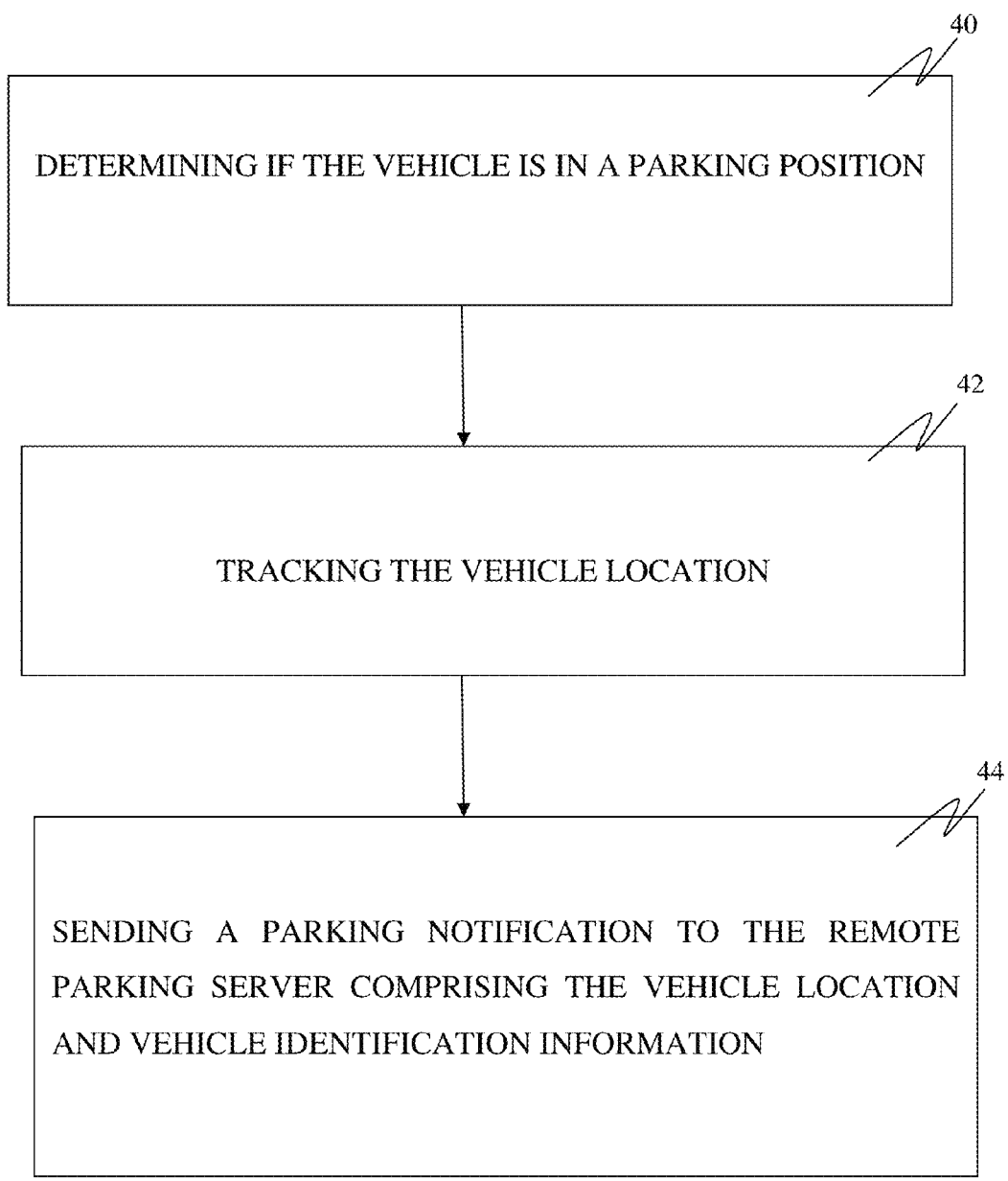
FIG. 4 illustrates a vehicle parking management method in accordance with an embodiment of the invention.
Figure 5:
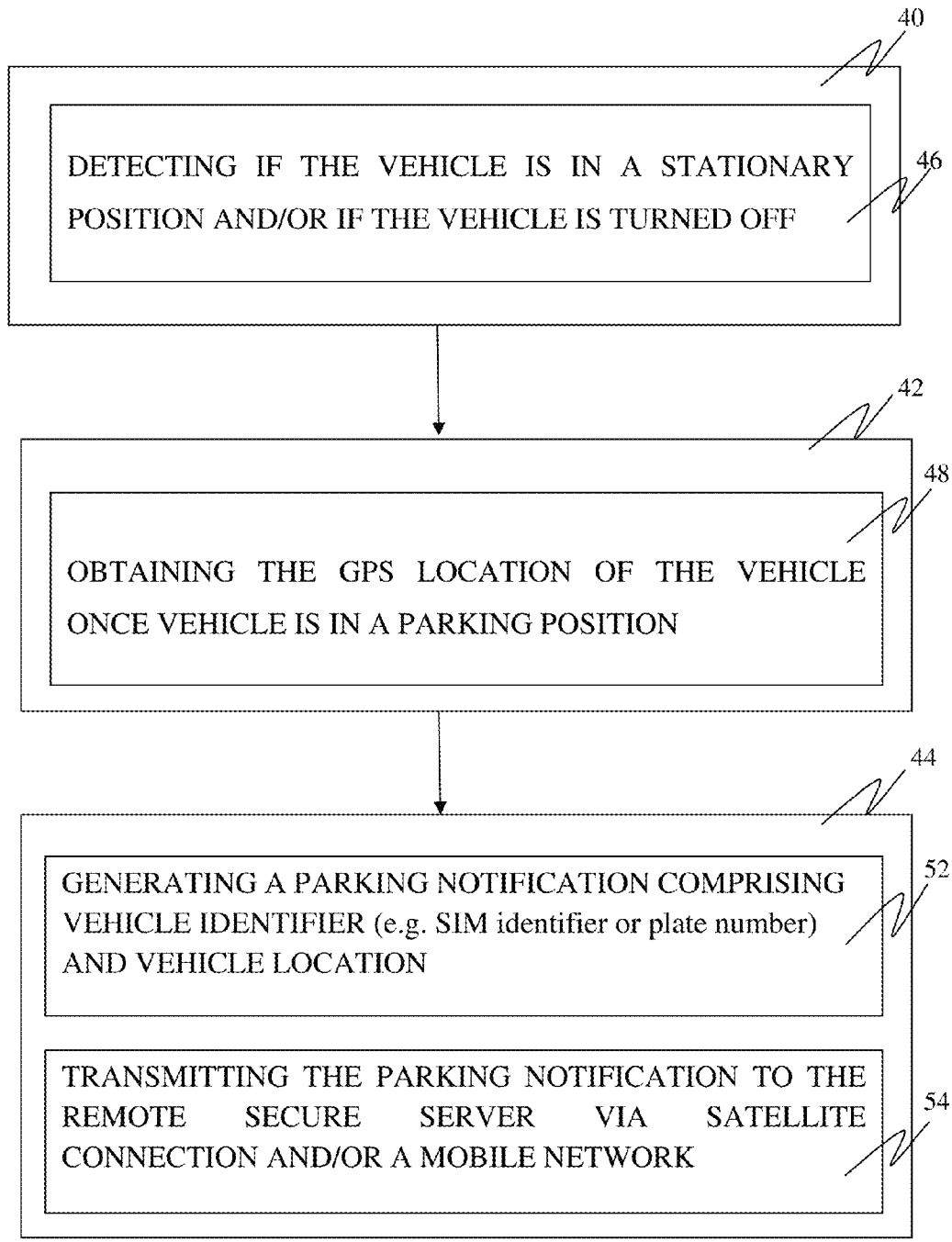
FIG. 5 illustrates a vehicle parking management method in accordance with another embodiment of the invention.

FIGS. 4 and 5 illustrate the process conducted by the vehicle parking management device 2 from the functional perspective. The device 2 is adapted to determine if the vehicle is in a parking position 40, to track the vehicle's location and 42 and to send a parking notification to the remote parking management server 57 comprising the vehicle location and vehicle identification information while the vehicle is in a parking position. In an embodiment of the invention, the parking notification is sent a single time once the vehicle is determined to be in a parking position (after being in a movement position). This is in order to avoid sending redundant parking notifications to the remote parking management server 57 which would increase power consumption (e.g. battery consumption) and lead to the inefficient use of power. Once the vehicle moves away from the parking position, the remote parking management unit 18 sends a parking end notification to the remote parking management server 57. According to an embodiment of the invention, the vehicle is determined to be in a parking position if the vehicle is in a stationary position and/or if the vehicle is turned off 46. According to an embodiment of the invention, tracking the vehicle's location 42 comprises obtaining the GPS location of the vehicle once the vehicle is in a parking position 48. According to an embodiment of the invention, the vehicle identifier is a SIM module/Chip identifier or a plate number of the vehicle 52, and the transmission of the parking notification to the remote parking management secure server is made through a satellite connection and/or a mobile network.

In an embodiment of the invention, the information storage unit 16 comprises contact information contact information for a user associated with the vehicle (e.g. vehicle owner). The contact information can comprise for example an email address and/or a mobile device identifier such as a mobile phone number. This contact information can be accessed and used by the vehicle parking management unit 18 for communicating with the user for example for sending the electronic parking payment ticket and/or payment confirmation notification and/or an electronic fine.

In an embodiment of the invention, there is provided a vehicle comprising a vehicle parking management device 2.

Vehicle Parking Payment System

Figure 9:
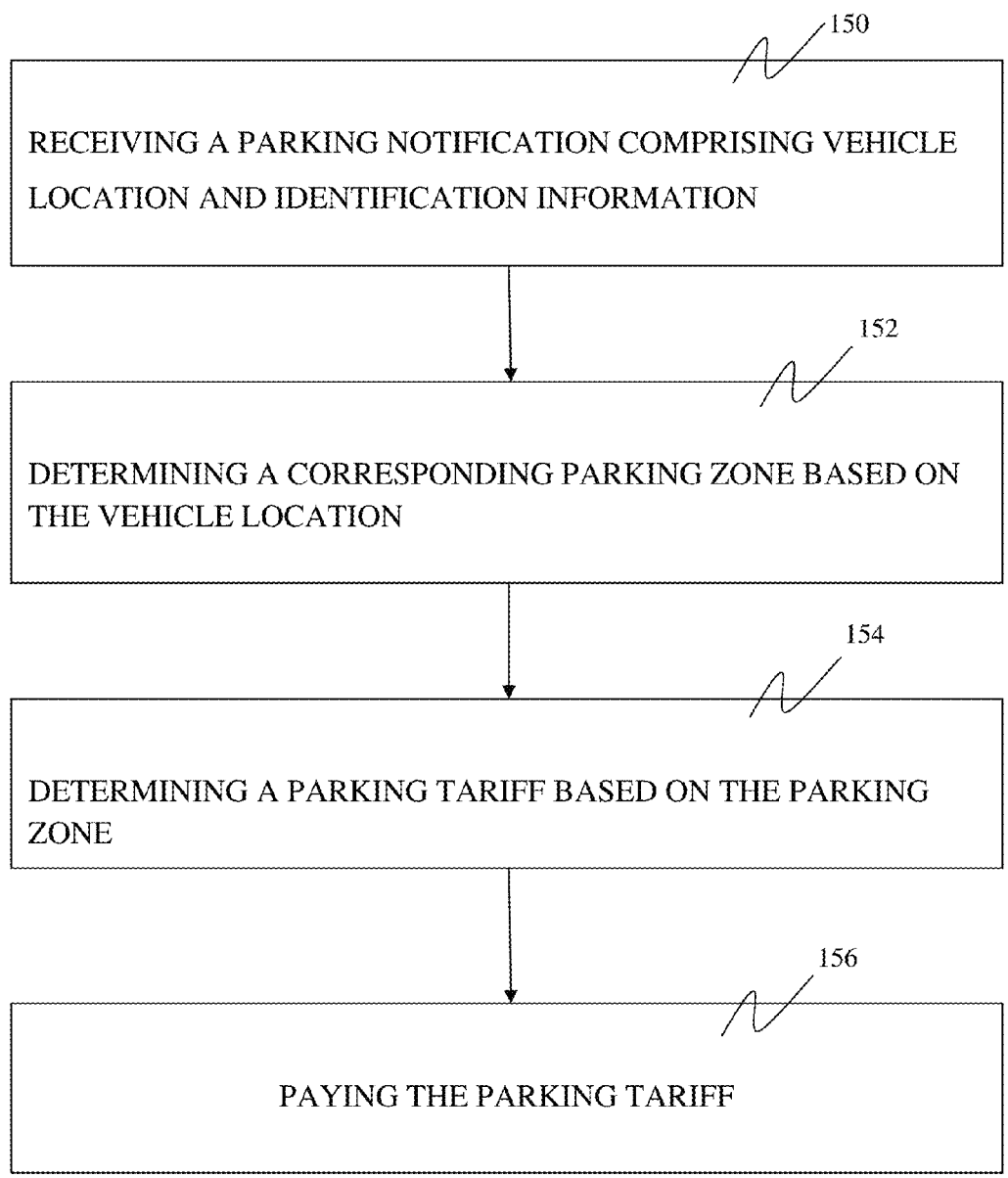
FIG. 9 illustrates a parking payment method in accordance with an embodiment of the invention.
Figure 10:
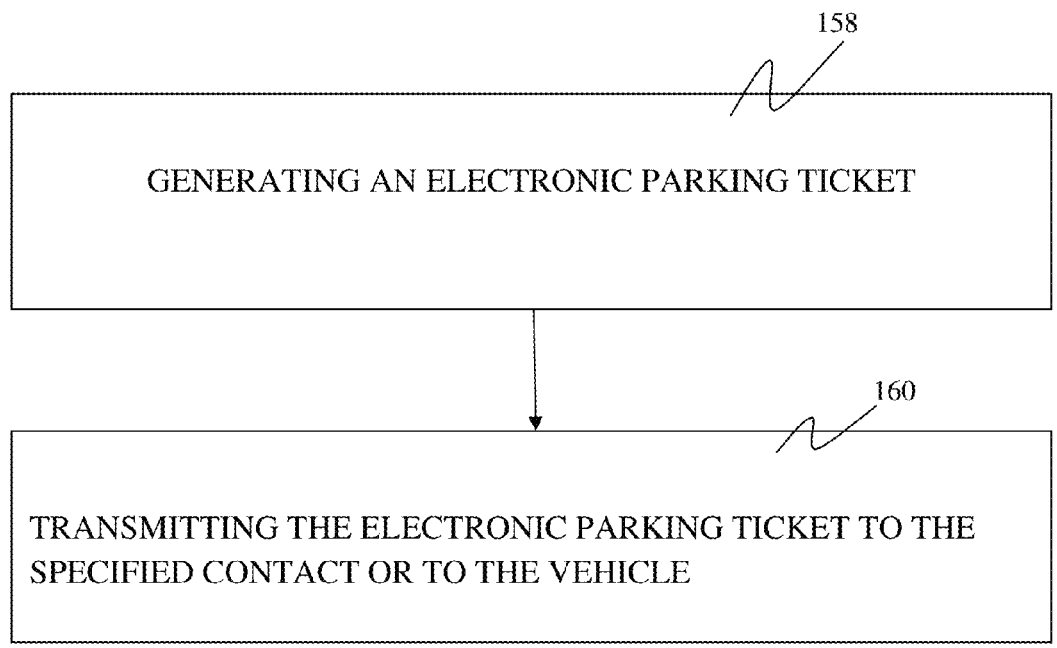
FIG. 10 illustrates further steps for generating and transmitting electronic payment tickets as part of the parking payment method in accordance with an embodiment of the invention.

As a further aspect of the invention, there is provided a vehicle parking payment system 99 which is adapted to be used at the traffic control authority level for managing payment of parking tariffs by vehicles. The parking payment system 99 receives a parking notification comprising the vehicle location and vehicle identification information 150, determines a corresponding parking zone based on the vehicle location 152, determines a parking tariff based on the parking zone 154 and pay the parking tariff 156 (see FIG. 9). In an embodiment of the invention, the parking payment system 99 further generates an electronic parking ticket and/or payment confirmation notification 158 and transmits the electronic parking ticket and/or payment confirmation notification to the vehicle parking management device 10 (see FIG. 10). The parking notification can be generated and transmitted to the parking management system 99 using any suitable means. For example, the parking notification can be generated using a mobile application running on a mobile device of a user associated with the vehicle, or alternatively using a text message, or alternatively using a device adapted to automatically acquire the information comprised in the parking notification. In an embodiment of the invention, the parking notification is transmitted by the vehicle parking management device 2. At the vehicle parking management device 2, the electronic parking ticket and/or payment confirmation is communicated to the user using the user interface 15. This can for example be displayed to a screen display at the user interface 15 to the user.

Figure 6:
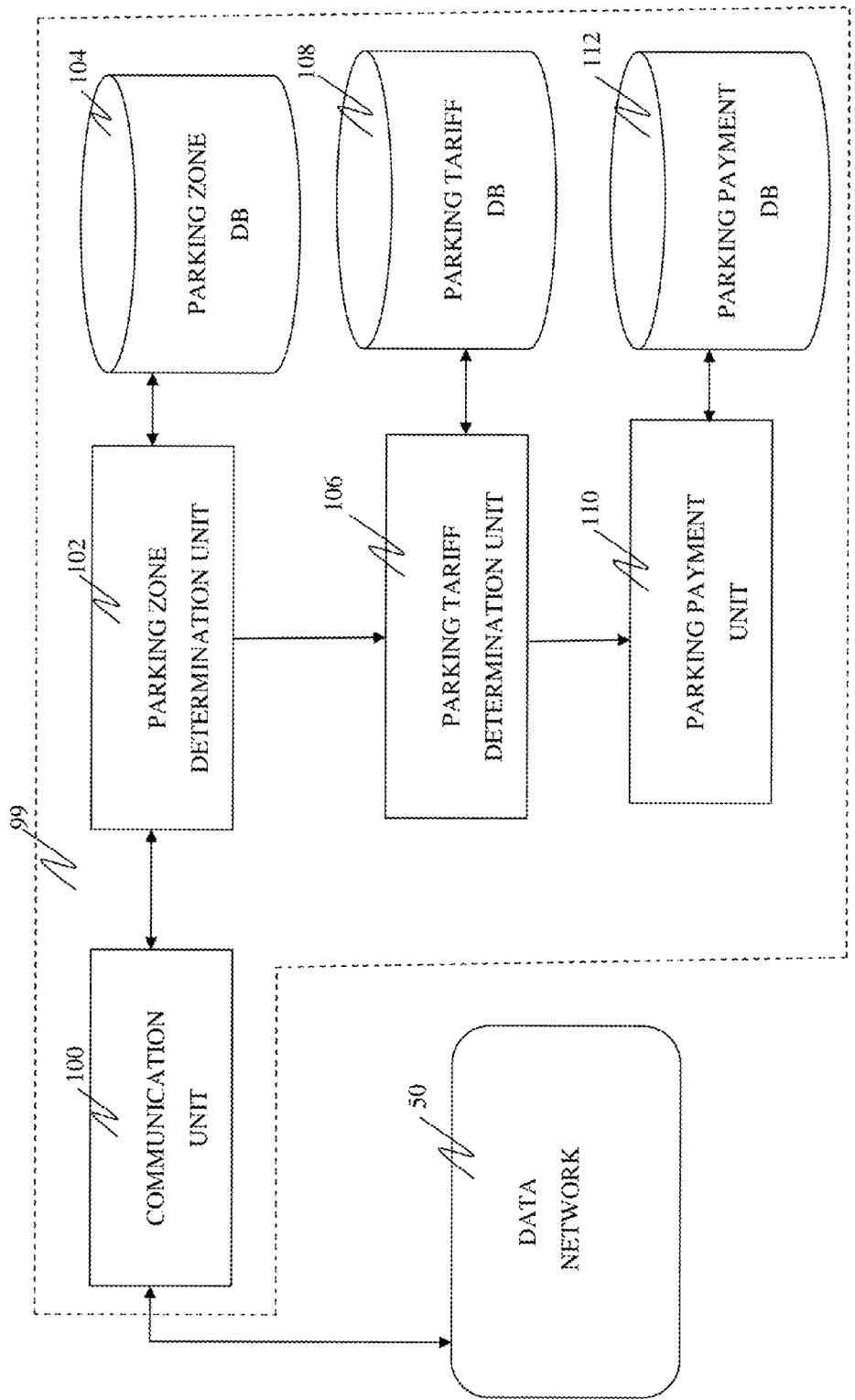
FIG. 6 illustrates a parking payment system in accordance with an embodiment of the invention.

In an embodiment of the invention, the parking payment system 99 comprises a communication unit 100, a parking zone determination unit 102, a parking zones database 104, a parking tariff determination unit 106, a parking tariff database 108, a parking payment unit 110 and a parking payment database 112 (see FIG. 6).

The parking zone determination unit 102 is adapted to be connected to the communication unit 100 for receiving the parking notification. The parking zone determination unit 102 is further adapted to be connected to the parking zones database 104 for querying the database 104 using the vehicle location. The parking zones database 104 stores data enabling to map the vehicle location to a corresponding parking zone among the existing parking zones as defined by the traffic authorities. The parking zones database 104 can for example store a topographic map divided based on the existing parking zones with data enabling to plot a geographical location (i.e. the vehicle location) to a corresponding location within the topographic map and to a corresponding parking zone. In an embodiment of the invention, the topographic map is a GPS topographic map and the vehicle location is represented by GPS coordinates.

The parking zone determination unit 102 is adapted to be connected to the parking tariff determination unit 106 for transmitting thereto the determined parking zone for purposes of determining by the parking tariff determination unit 106 the corresponding parking tariff. For this end, the parking tariff determination unit 106 is adapted to be connected to a parking tariff database storing data enabling to map the parking zone to the corresponding parking tariff. The parking tariff determination unit 106 determines the corresponding parking tariff in association with the vehicle and sends the information to the parking payment unit 110.

The parking tariff determination unit 106 is adapted to be connected to the parking payment unit 110 for transmitting thereto the parking tariff for purposes of paying the required parking tariff. The parking payment unit 110 is adapted to be connected to a parking payment database 112 for storing information related to the payment of the tariff. The parking payment database 112 stores the vehicle identification information, the parking zone where the vehicle is parked and the parking tariff paid. The time period associated with the parking tariff can be predetermined in advance, for example 1 hour, and renewed automatically as long as the vehicle is still parked in the same parking position.

In an embodiment of the invention, the vehicle parking management device 2 is adapted to transmit parking notifications to the parking management system 99 at a time frequency corresponding to this predetermined time period, for example each one hour. In an alternative embodiment, the parking management system 99 is adapted to send update requests to the vehicle parking management device 2 for obtaining updates with respect to the parking position of the vehicle. The vehicle parking zone determination unit 102 can be adapted to send such parking update requests to the vehicle parking management device 2 which are processed by the vehicle parking management unit 18. The latter communicates with the vehicle tracking unit 12 for determining whether the vehicle is remained in the same parking position and transmits back the information to the parking management system 99.

In an embodiment of the invention, the vehicle parking management device 2 sends a parking notification end to the parking management system 99 once the vehicle moves away from the parking position. In this case, the parking payment unit 110 can be adapted to renew automatically the payment of the parking tariff at the end of the time period for another time slot as long as the parking end notification has not been received by the parking management system 99 as this would be interpreted as the vehicle remains in the same parking position. When a parking end notification is received by the parking management system 99, the parking zone determination unit 102 processes the notification and transmits the information parking payment unit 110. The parking zone determination unit 102 can be adapted to be connected directly to the parking payment unit 110 for communicating such information.

Figure 8:
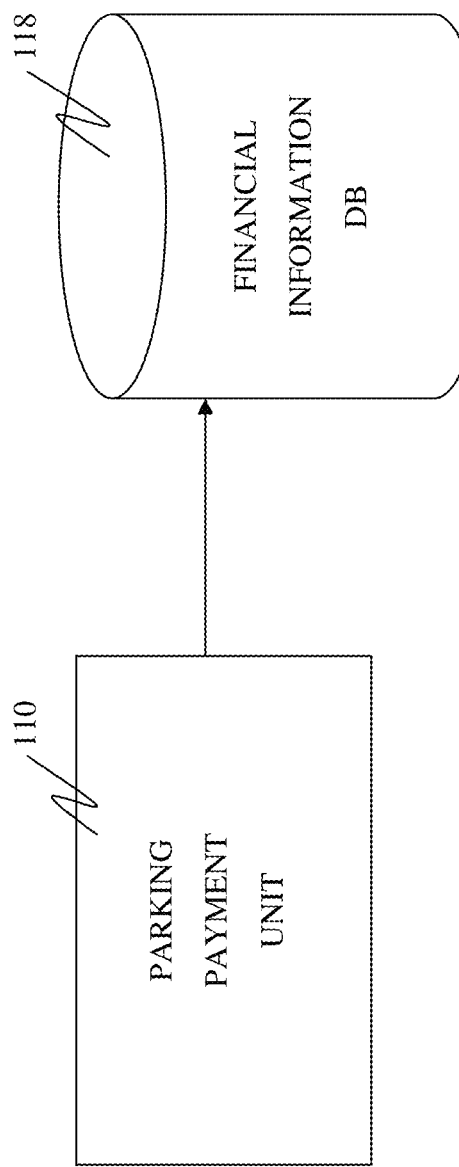
FIG. 8 illustrates a parking payment unit in connection with a financial information database as part of a parking payment system in accordance with a an embodiment of the invention.

In an embodiment of the invention, the parking notification sent by the vehicle parking management device 2 to the parking management system 99 comprises financial information for processing the payment of the parking tariff. In this case, the parking payment unit 110 uses the financial information for conducting the payment of the parking tariff. In another embodiment of the invention, the parking management system 99 comprises a financial information database 118 comprising data mapping the vehicle identification information related to financial information associated with the vehicle. In this case, the parking payment unit 110 is adapted to retrieve the financial information from the financial information database 118 based on the vehicle identification information and using the retrieved financial information for paying the parking tariff (see FIG. 8).

Figure 7:
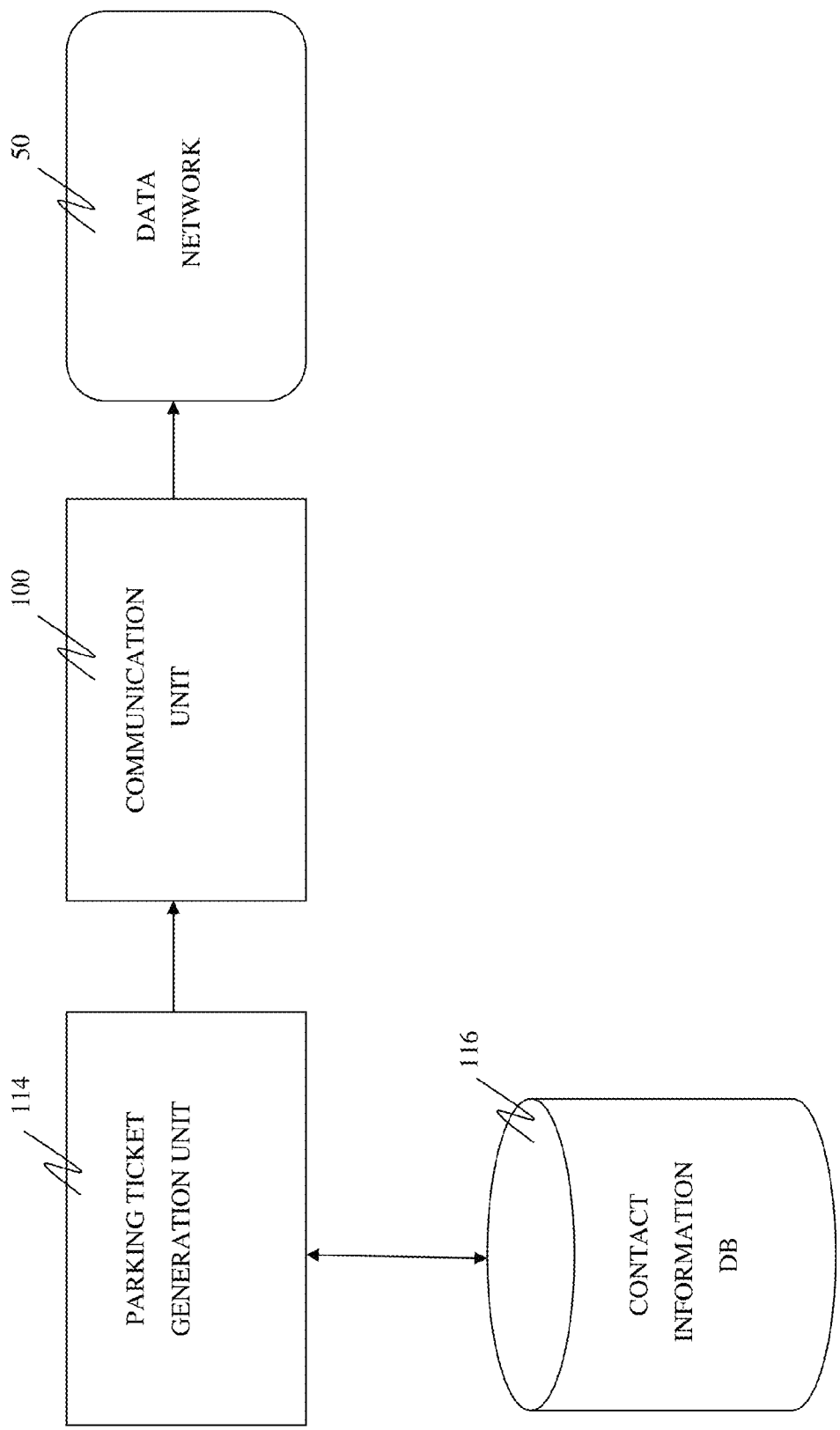
FIG. 7 illustrates a parking ticket generation unit in connection with a contact information database and a communication unit as part of a parking payment system in accordance with an embodiment of the invention.

In an embodiment of the invention, the parking management system 99 further comprises a parking ticket generation unit 114 adapted to be connected to parking payment unit 110 and/or the parking payment database 112 as well as to the communication unit 100 for generating an electronic parking ticket and/or payment confirmation notification and transmitting the electronic parking ticket and/or payment confirmation notification to the vehicle parking management device 10 via the data network 50 (see FIG. 7). At the vehicle parking management device 2, the electronic parking ticket and/or payment confirmation is communicated to the user using the user interface 15. This can for example be displayed to a screen display at the user interface 15 to the user.

In an embodiment of the invention, the parking notification sent by the vehicle parking management device 2 comprises contact information about a user associated with the vehicle. In this case, the electronic parking ticket and/or payment confirmation notification can be sent to the user directly using the contact information using the data network 50. The contact information can comprise for example an email address and/or a mobile device identifier such as a mobile phone number. In an alternative embodiment of the invention, the parking management system 99 further comprises a contact information database 116 adapted to be connected to the parking ticket generation unit 114 storing contact information associated with the vehicle and/or user. The contact information can be mapped to the vehicle information. In this case, the parking ticket generation unit 114 is adapted to retrieve the contact information from the contact information database 116 and using this information for sending the electronic paring ticket and/or parking confirmation notification to the user.

In an embodiment of the invention, the data network 50 is a mobile network and the electronic parking ticket and/or payment confirmation notification are transmitted to the vehicle parking management device and/or to the user using the mobile network. This can for example to a SIM module/chip 30 associated with the vehicle parking management device 2 and/or to the mobile device of the user. In another embodiment of the invention, the data network 50 is a satellite network.

In an embodiment of the invention, the parking management system is part of a parking management server 57 comprising at least one microprocessor. This server 57 is also referred to as a parking payment server according to this embodiment.

Parking Payment Control System

Figure 14:
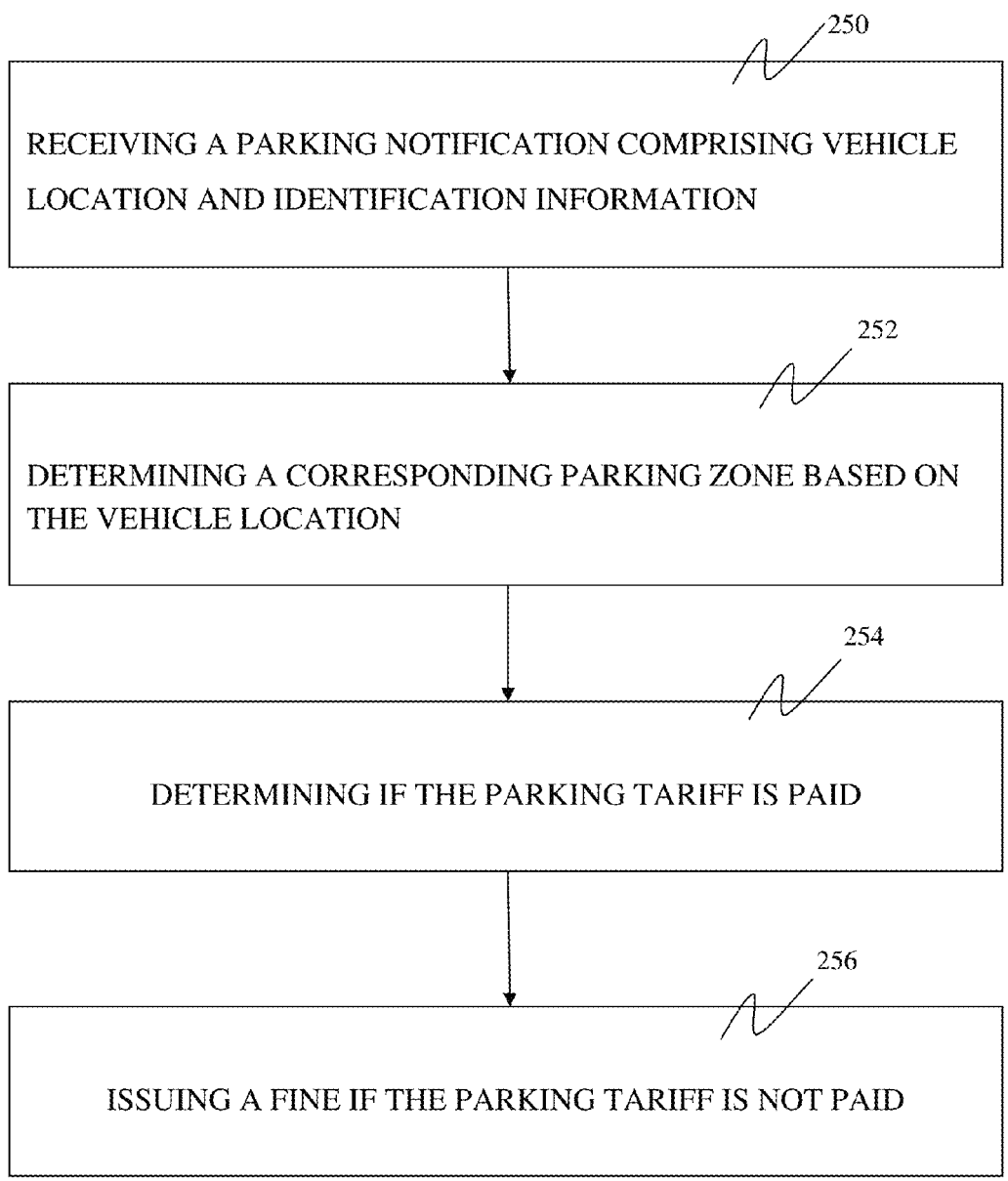
FIG. 14 illustrates a parking payment control method in accordance with an embodiment of the invention.
Figure 15:
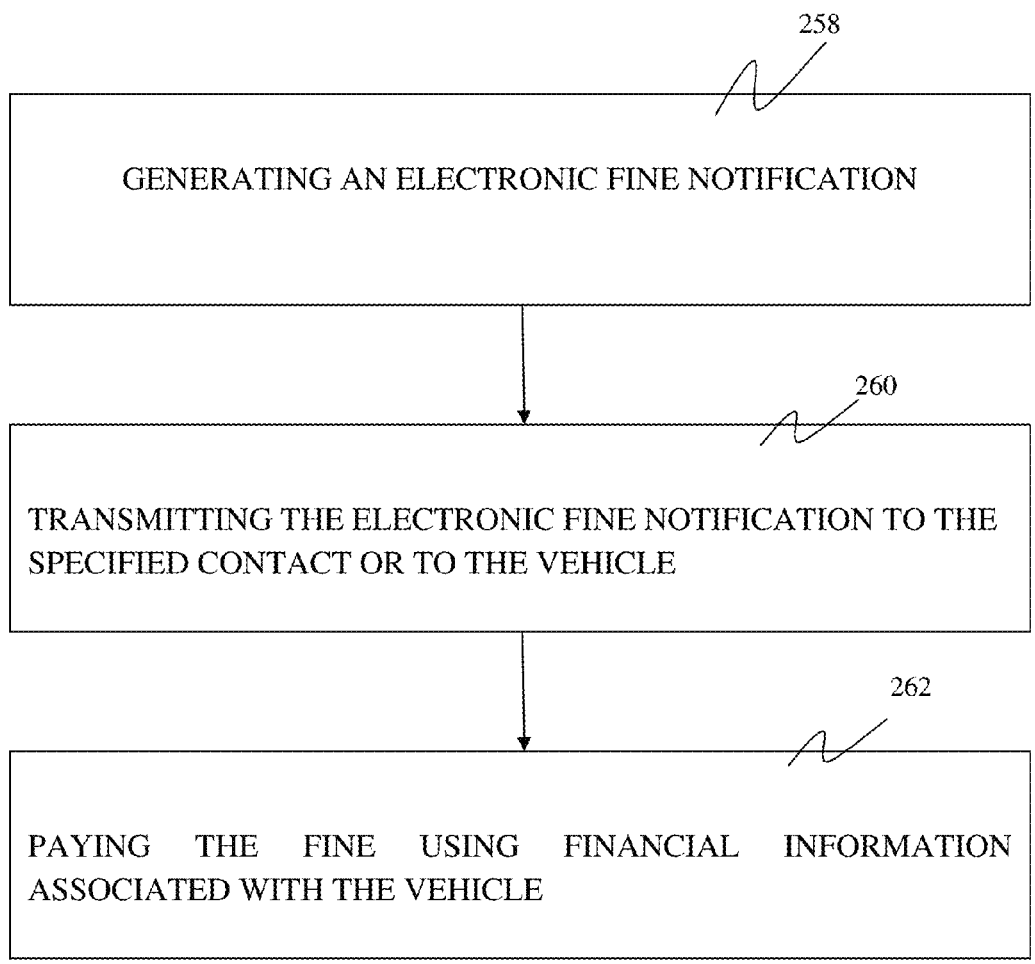
FIG. 15 illustrates further steps of generating, transmitting and paying a fine as part of the parking payment control method in accordance with an embodiment of the invention.

As a further aspect of the invention, there is provided a parking payment control system 199 for controlling the tariff payment of vehicles. The parking payment control system 199 is preferably located at the traffic authority's level. The parking payment control 199 is adapted for receiving a parking notification comprising the vehicle location and vehicle identification information 250, determining a corresponding parking zone based on the vehicle location 252, determining if the parking tariff associated with the parking zone has been paid for the vehicle 254, and for issuing a fine if the parking tariff has not been paid 256 (see FIG. 14). In an embodiment of the invention, the parking payment control system 199 is further adapted for generating an electronic fine and/or fine notification 258, transmitting the electronic fine and/or notification to the vehicle or a user associated with the vehicle 260, and for paying the fine using financial information associated with the vehicle 262 (see FIG. 15). The parking notification can be generated and transmitted to the parking management system 99 using any suitable means such as a device adapted to automatically acquire the information comprised in the parking notification and to send the parking notification to the parking payment control system 199. In an embodiment of the invention, the parking notification is transmitted by the vehicle parking management device 2. At the vehicle parking management device 2, the electronic fine and/or fine issuance notification message is communicated to the user using the user interface 15. This can for example be displayed to a screen display at the user interface 15 to the user.

Figure 11:
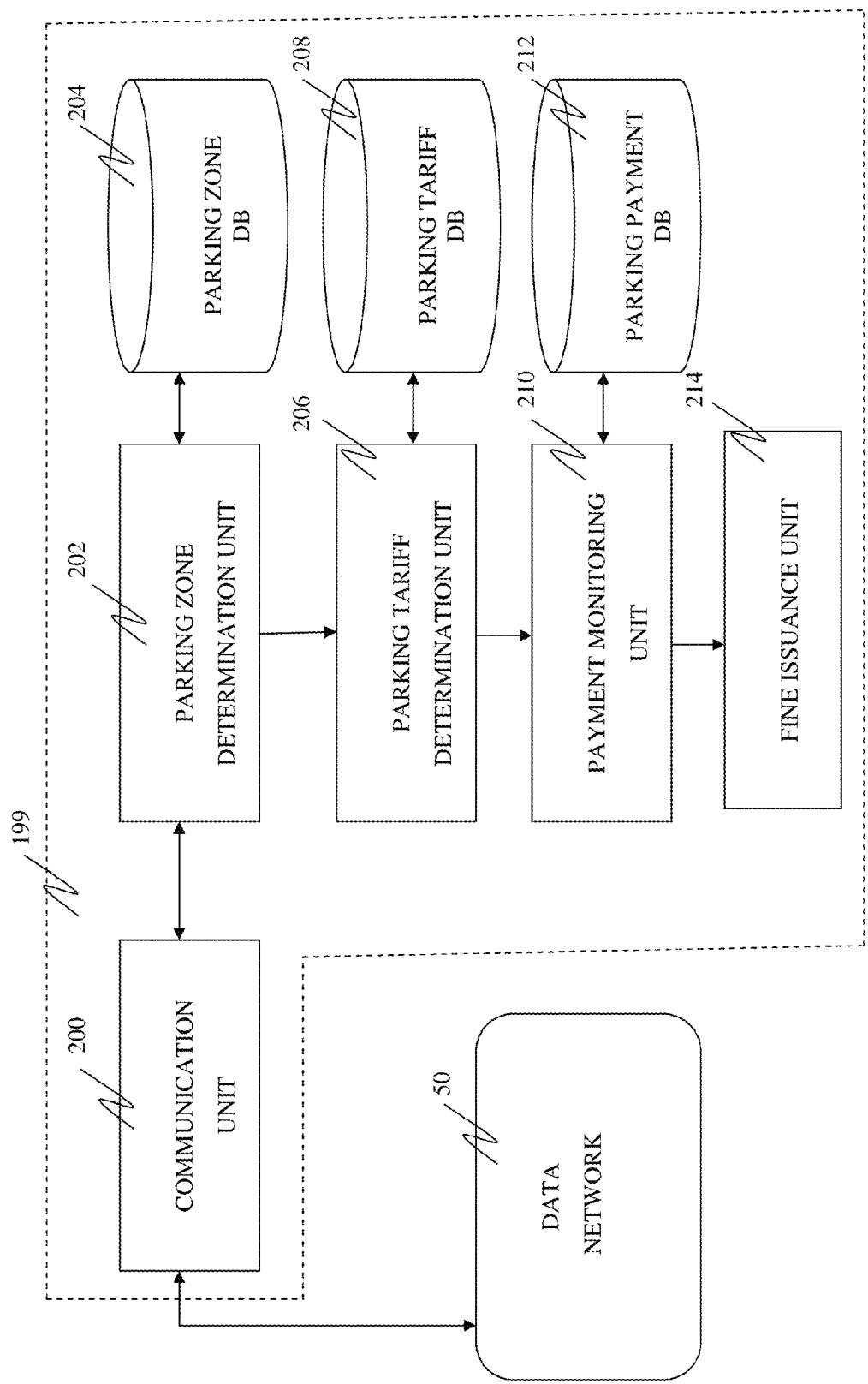
FIG. 11 illustrates a parking payment control system in accordance with an embodiment of the invention.

In an embodiment of the invention, the parking payment control system 199 comprises a communication unit 200, a parking zone determination unit 102, a parking zones database 204, a parking tariff determination unit 206, a parking tariff database 208, a parking payment monitoring unit 210 and a parking payment database 212 and a fine issuance unit 214 (see FIG. 11).

The parking zone determination unit 202 is adapted to be connected to the communication unit 200 for receiving the parking notification. The parking zone determination unit 202 is further adapted to be connected to the parking zones database 204 for querying the database 204 using the vehicle location. The parking zones database 204 stores data enabling to map the vehicle location to a corresponding parking zone among the existing parking zones as defined by the traffic authorities. The parking zones database 204 can for example store a topographic map divided based on the existing parking zones with data enabling to plot a geographical location (i.e. the vehicle location) to a corresponding location within the topographic map and to a corresponding parking zone. In an embodiment of the invention, the topographic map is a GPS topographic map and the vehicle location is represented by GPS coordinates.

The parking zone determination unit 202 is adapted to be connected to the parking tariff determination unit 206 for transmitting thereto the determined parking zone for purposes of determining by the parking tariff determination unit 206 the corresponding parking tariff. For this end, the parking tariff determination unit 206 is adapted to be connected to a parking tariff database storing data enabling to map the parking zone to the corresponding parking tariff. The parking tariff determination unit 206 determines the corresponding parking tariff in association with the vehicle and sends the information to the parking payment monitoring unit 210.

The parking tariff determination unit 206 is adapted to be connected to the parking payment monitoring unit 210 for transmitting thereto the parking tariff for purposes of determining if the required parking tariff is paid. The parking monitoring payment unit 110 is adapted to be connected to a parking payment database 212 storing information related to vehicle parking tariff payments. The parking payment database 212 stores vehicle identification information, the time periods in association with which parking tariffs have been paid and the corresponding parking zones where vehicles are parked.

In an embodiment of the invention, the vehicle parking management device 2 is adapted to transmit parking notifications to the parking payment control system 199 at a time frequency corresponding to this predetermined time period, for example each one hour. In an alternative embodiment, the parking payment control system 199 is adapted to send update requests to the vehicle parking management device 2 for obtaining updates with respect to the parking position of the vehicle. The vehicle parking zone determination unit 202 can be adapted to send such parking update requests to the vehicle parking management device 2 which are processed by the vehicle parking management unit 18. The latter communicates with the vehicle tracking unit 12 for determining whether the vehicle is remained in the same parking position and transmits back the information to the parking payment control system 199. The vehicle payment monitoring unit 210 processes the parking notification received for determining whether the parking tariff has been paid.

In an embodiment of the invention, the vehicle parking management device 2 sends a parking notification end to the parking management system 99 once the vehicle moves away from the parking position. In this case, the parking payment unit 110 can be adapted to automatically issue a fine for non payment of the parking tariff at the end of the time period if the parking end notification has not been received at the parking payment control system 199 as this would be interpreted as the vehicle is still in the same parking position while the parking tariff payment has not been renewed. When a parking end notification is received by the parking management system 199, the parking zone determination unit 102 processes the notification and transmits the information to the parking payment monitoring unit 210. The parking zone determination unit 202 can be adapted to be connected directly to the parking payment monitoring unit 210 for communicating such information. The parking payment monitoring unit 210 instructs the fine issuance unit 214 for issuing a fine in connection with the vehicle.

Figure 13:
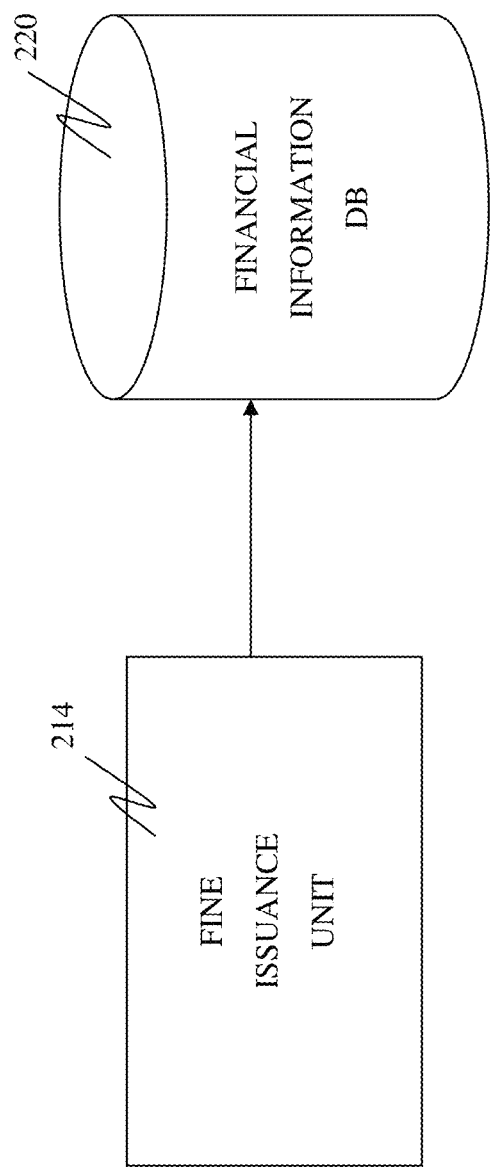
FIG. 13 illustrates a fine issuance unit in connection with a financial information database as part of a parking payment control system in accordance with an embodiment of the invention.

In an embodiment of the invention, the parking notification sent by the vehicle parking management device 2 to the parking payment control system 199 comprises financial information for processing the payment of the issued fine. In this case, the fine issuance unit 214 uses the financial information for conducting the payment of the issued fine. In another embodiment of the invention, the parking payment control system 199 comprises a financial information database 220 comprising data mapping the vehicle identification information related to financial information associated with the vehicle. In this case, the fine issuance unit 214 is adapted to retrieve the financial information from the financial information database 220 based on the vehicle identification information and using the retrieved financial information for paying the issued fine (see FIG. 13).

Figure 12:
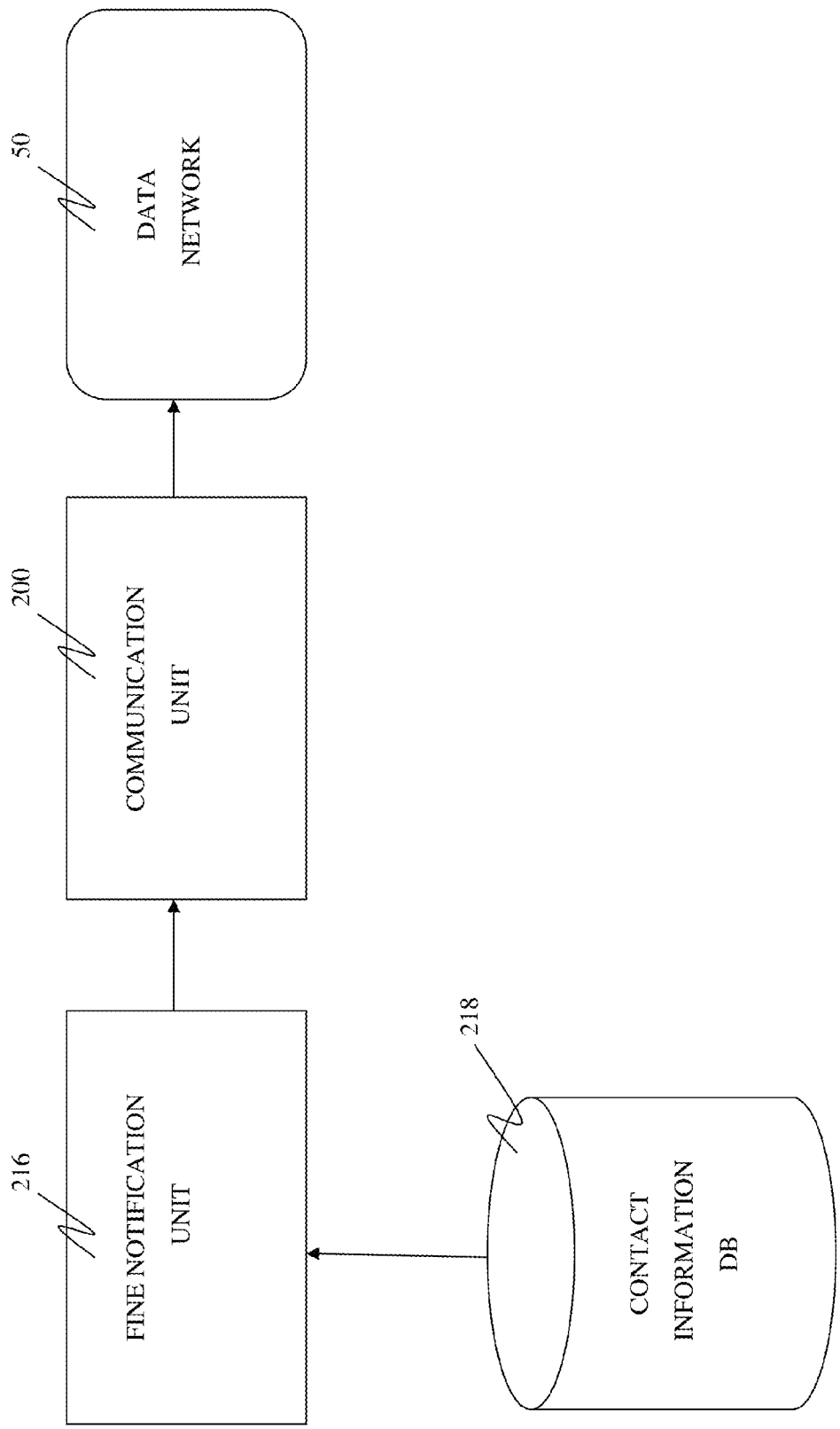
FIG. 12 illustrates a fine notification unit in connection with a contact information database and a communication unit as part of parking payment control system in accordance with an embodiment of the invention.

In an embodiment of the invention, the parking payment control system 199 further comprises a fine notification unit 216 adapted to be connected to fine issuance unit 214 as well as to the communication unit 200 for generating an electronic fine and/or fine notification and transmitting the electronic fine and/or fine notification to the vehicle parking management device 10 via the data network 50 (see FIG. 12). At the vehicle parking management device 2, the electronic fine and/or fine notification is communicated to the user using the user interface 15. This can for example be displayed to a screen display at the user interface 15 to the user.

In an embodiment of the invention, the parking notification sent by the vehicle parking management device 2 comprises contact information about a user associated with the vehicle. In this case, the electronic fine and/or fine notification can be sent to the user directly using the contact information using the data network 50. The contact information can comprise for example an email address and/or a mobile device identifier such as a mobile phone number. In an alternative embodiment of the invention, the parking payment control system 199 further comprises a contact information database 218 adapted to be connected to the fine notification unit 216 storing contact information associated with the vehicle and/or user. The contact information can be mapped to the vehicle information. In this case, the fine notification unit 114 is adapted to retrieve the contact information from the contact information database 218 and using this information for sending the electronic fine and/or fine notification to the user.

In an embodiment of the invention, the data network 50 is a mobile network and the electronic fine and/or fine notification are transmitted to the vehicle parking management device and/or to the user using the mobile network. This can for example to a SIM module/chip 30 associated with the vehicle parking management device 2 and/or to the mobile device of the user. In another embodiment of the invention, the data network 50 is a satellite network.

In an embodiment of the invention, the parking management system is part of a parking management server 57 comprising at least one microprocessor. This server 57 is also referred to as a parking payment control server according to this embodiment.

Global Positioning System (GPS) Correction

As a further aspect of the invention, there is provided a GPS correction system 299 for correcting GPS coordinates in general, and particularly those obtained by vehicle parking management devices 2. In fact, the determination of parking zones of parking vehicles requires a good degree of accuracy in the location of vehicles obtained. If the vehicle location information used for the determination of a corresponding parking zone is not sufficiently accurate, the corresponding parking zone determined may be wrong. As GPS coordinates obtained by GPS devices can have a certain error zone (up to 10 meters), the probability of inaccurately determining parking zones corresponding to vehicles location become high for vehicles parked at the borders of adjacent parking zones. For example, if the vehicle is parked in parking zone A within a couple of meters proximity of parking zone B, if the GPS coordinates obtained for the vehicle location are not sufficiently accurate, this may lead to the determination of zone B as a corresponding parking zone of the vehicle. This would lead to parking management issues such as the wrong determination of the parking tariff (in this example, parking tariff of parking zone B instead of parking zone A).

The GPS correction system 299 is adapted to correct GPS coordinates obtained in association with moving or stationary objects, such as vehicles, for increasing the accuracy of these coordinates. In an embodiment of the invention, these GPS coordinates are obtained using the vehicle parking management devices 2 in association with parking vehicles, and the corrected GPS coordinates are used for the determination of parking zones by the parking zone determination units 102 and 202 associated to the parking payment system 99 and the parking payment control system 199 respectively. The GPS correction system 299 comprises benchmark GPS devices 300 distributed respectively at a priori known stationary benchmark points within corresponding geographical zones.

Figure 16:
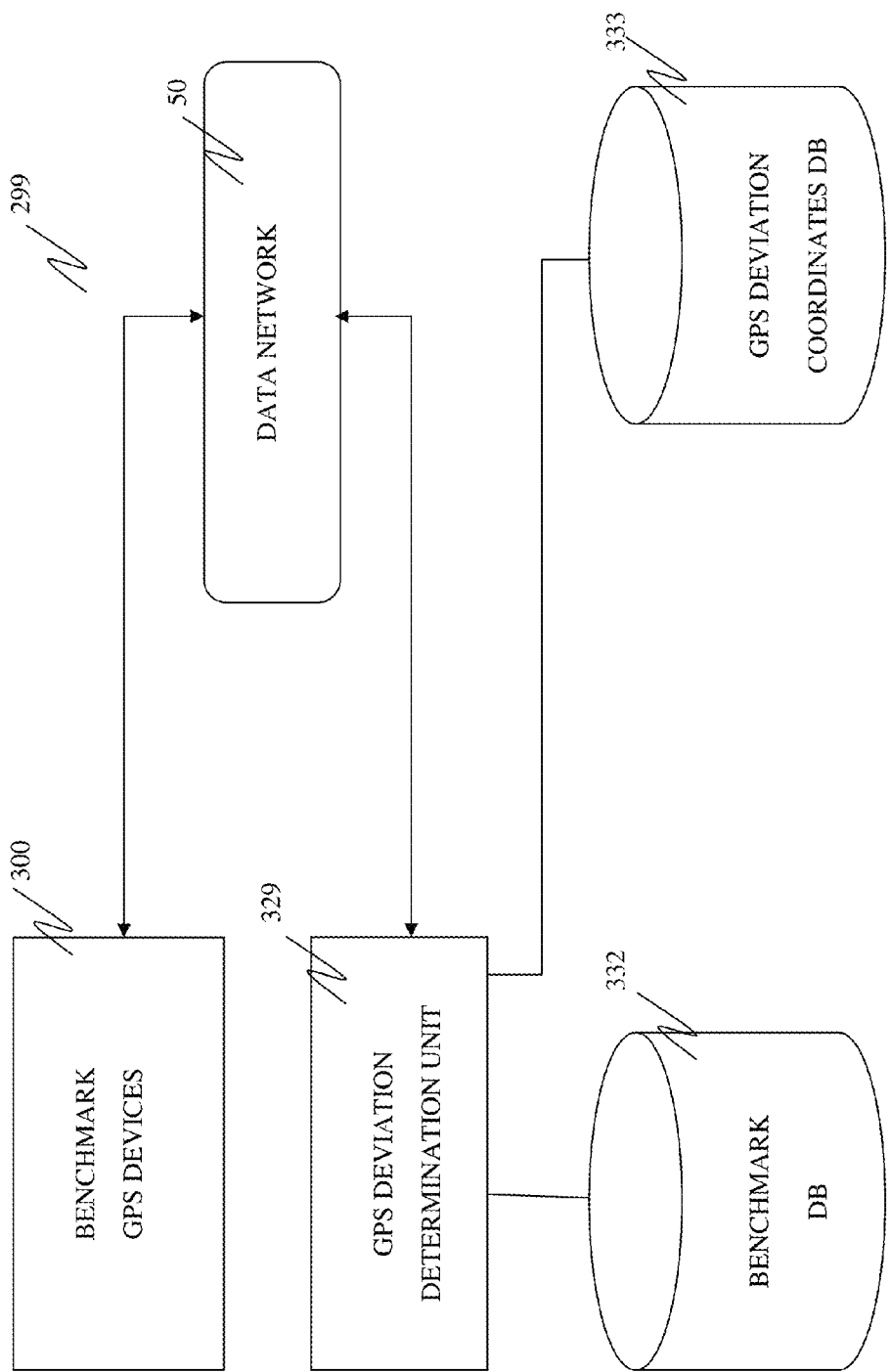
FIG. 16 illustrates a GPS correction system in accordance with an embodiment of the invention.

As illustrated in FIG. 16, the GPS correction system 299 further comprises a GPS deviation determination unit 329, a benchmark database 332 and a GPS coordinates deviation database 333. The benchmark GPS devices 300 are adapted to be connected to the GPS deviation determination unit 329 via a data network 50, such as a satellite data network or a mobile data network. In this last case a SIM module/Chip is connected to each one of the benchmark GPS devices for obtaining and transmitting the GPS coordinates read by these benchmark GPS devices 300 to the GPS deviation determination unit 329. The GPS deviation determination unit 329, the benchmark database 332 and the GPS coordinates deviation database 333 can be part of a same server or alternatively separate servers (referred to as the GPS correction server).

The stationary benchmark points can be benchmark stands on which the benchmark GPS devices are mounted. As these benchmark stands have a priori known locations, the exact (error-free) GPS coordinates of these benchmark stands are known a priori and stored in the benchmark database 332. The benchmark GPS devices 300 are read when needed according to the application (e.g. in real time) for obtaining the GPS coordinates of these benchmark points as read by these benchmark GPS devices 300 and are transmitted to the GPS deviation determination unit 329 where they are compared to the a prior known locations of these benchmark points using the benchmark GPS coordinates known a priori and stored in the benchmark database 332.

This comparison operation conducted by the GPS deviation determination unit 329 allows for determining the GPS coordinates deviation between the benchmark GPS coordinates and the GPS coordinates read by the benchmark GPS devices 300. These GPS coordinates deviations can be determined as frequently as desired based on the application (for example in real time, every 1 hour, etc). These GPS coordinates deviations would reflect the positioning inaccuracies (errors) in the GPS positioning conducted by the benchmark GPS devices 300. The GPS coordinates deviations determined by the GPS deviation determination unit 329 are stored in the GPS coordinates deviation database 333.

As each one of these benchmark GPS devices 300 is located within a corresponding geographical zone among the geographical zones, a corresponding GPS deviation measurement is mapped to each one of these geographical zones. These GPS deviation measurements corresponding to the different geographical zones would be up to a certain degree representative of the GPS positioning errors expected to occur using other GPS devices (such as the GPS devices 22 used by the vehicle management parking devices 2) within these geographical zones respectively. The GPS coordinates deviation database 333 stores data mapping the GPS coordinates deviations to the respective geographical zones.

The GPS coordinates deviation can be determined by measuring the deviation in the latitude coordinates and the deviation in the longitude coordinates. The GPS coordinates deviation can have two components, a first component corresponding to the deviation in latitude and the second component corresponding to the deviation in longitude. The GPS coordinates deviation can also correspond to a single component zone deviation determined by a mathematical calculation, for example by calculating the mean square error (deviation) between the benchmark GPS coordinates and the ones read by the benchmark GPS devices.

In an embodiment of the invention, a plurality of benchmark GPS devices 300 are distributed respectively at a plurality of benchmark points within a same geographical zone. In this case, each geographical zone among the geographical zones would comprise a plurality of benchmark points and respective benchmark GPS devices 300. For each one of the geographical zones, the corresponding benchmark points would have a priori known benchmark GPS coordinates. The GPS coordinates for each one of these benchmark GPS devices are read in course of operation and compared with their respective benchmark GPS coordinates. In this optics, for each one of the geographical zones, a number of GPS coordinates deviation values are determined which respectively correspond to the plurality of the benchmark points. These different measured deviation values corresponding to a same geographical zone can be used for determining an estimated GPS coordinates deviation for the corresponding geographical zone. In an embodiment of the invention, for each geographical zone among the geographical zones, a corresponding Root Mean Square Deviation (RMSD) is determined using these various GPS coordinates deviation values. The higher the number of these benchmark points within a same geographical zone is, the more accurate the RMSD would be.

Figure 17:
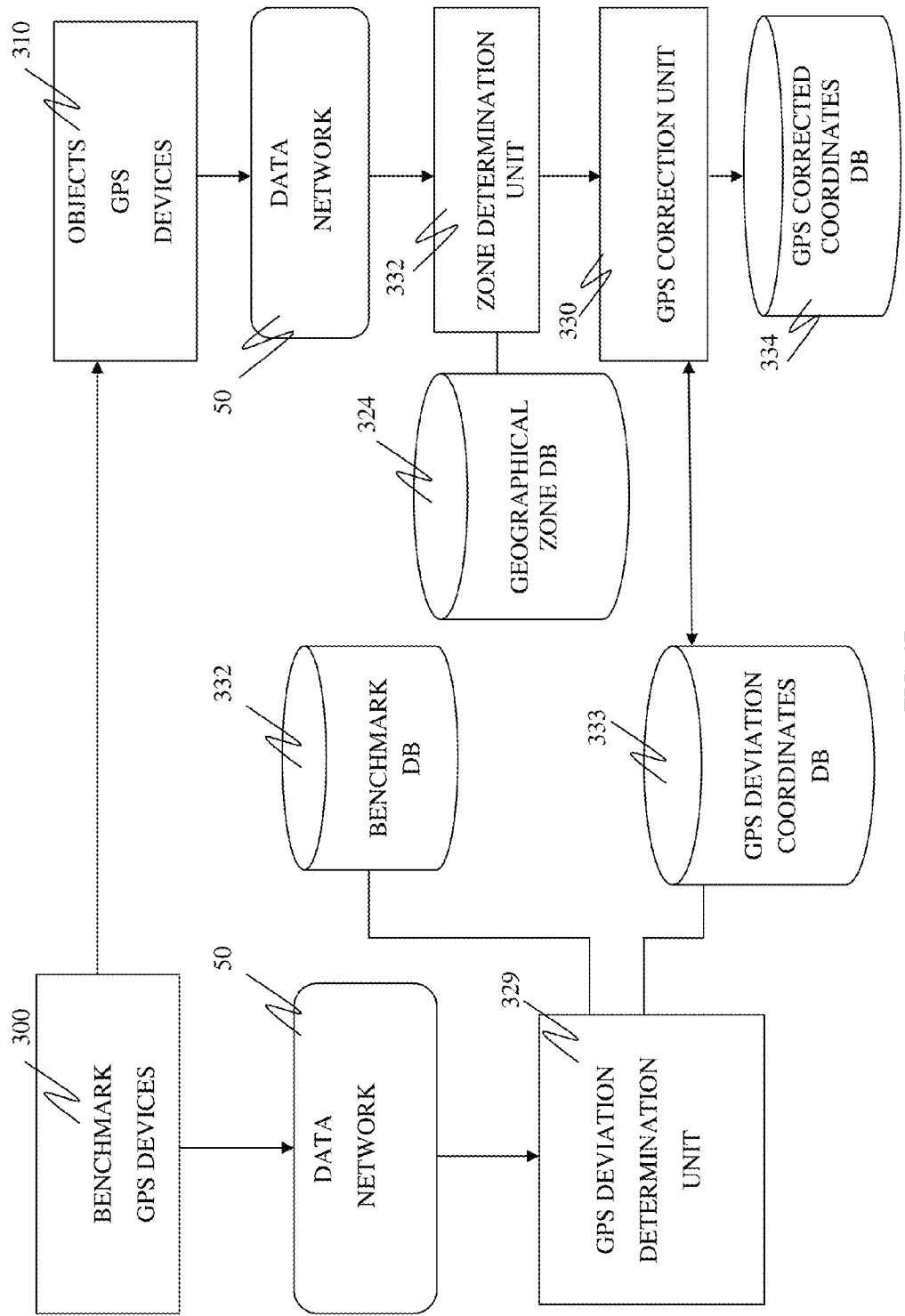
FIG. 17 illustrates a GPS correction system in accordance with another embodiment of the invention.

In an embodiment of the invention, the GPS correction system 299 further comprises a zone determination unit 322, a geographical zone database 324, a GPS correction unit 330 and a GPS corrected coordinates database 334 (see FIG. 17). The zone determination unit 322 receives GPS coordinates and identification information associated to objects within the geographical zones from corresponding objects GPS devices 310. The zone determination unit 322 determines the geographical zones corresponding to these objects by inquiring the geographical zones database 324 using the objects GPS coordinates. The geographical zones database 324 stores data enabling to map an object location using its GPS coordinates to a corresponding geographical zone among the geographical zones.

The zone determination unit 322 is adapted to be connected to the GPS correction unit 330 for transmitting thereto the geographical zone determined in association with the object along with the object GPS coordinates received. The GPS correction unit 330 is adapted to be connected to the GPS coordinates deviation database 333 for retrieving the GPS coordinates deviation associated with the geographical zone determined by the zone determination unit 322 and for determining corrected GPS coordinates of the object as a function of the received (uncorrected) object GPS coordinates and the GPS coordinate deviation. The GPS correction unit 330 is adapted to be connected to the GPS corrected coordinates database 334 for storing the corrected GPS coordinates in association with the object using the object identification information.

Figure 18:
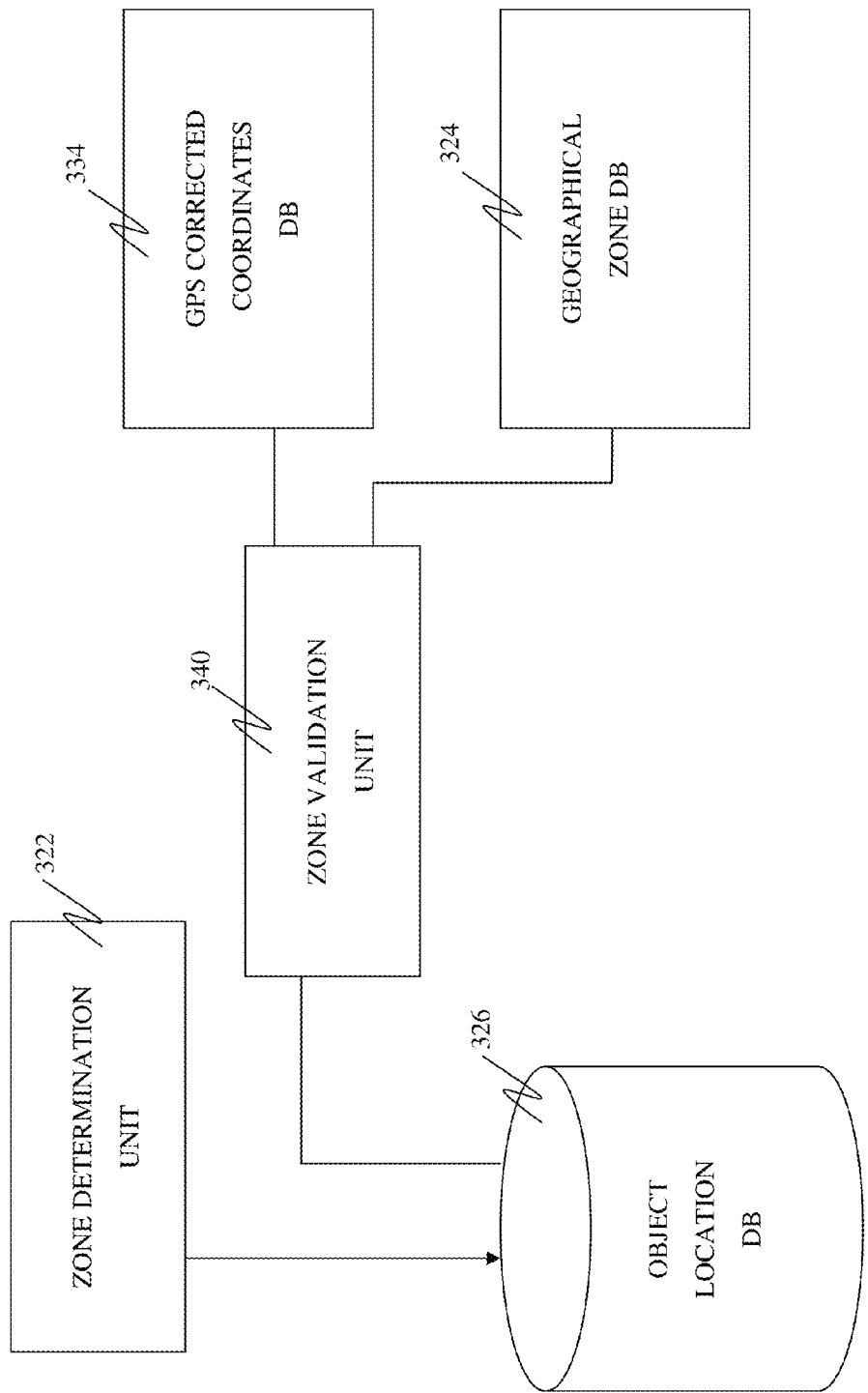
FIG. 18 illustrates a zone validation unit in connection with an object location database, a GPS corrected coordinates DB and a geographical zone DB as part of the GPS correction system in accordance with an embodiment of the invention.

In an embodiment of the invention, the GPS correction system 299 further comprises an object location database 326 adapted to be connected to the zone determination unit 322, the latter storing the geographical zone determined by thereby in association with the object inside the object location database 326 (see FIG. 18).

In an embodiment of the invention, the GPS correction system 299 further comprises a zone validation unit 340 adapted to be connected to the GPS corrected coordinates database 334, the geographical zone database 324 and the object location database 326. The zone validation unit 340 is adapted to retrieve the corrected GPS coordinates of the object from the GPS corrected coordinates database 334 and for inquiring the geographical zone database 324 using the corrected GPS coordinates for validating the geographical zone of the object based on the corrected GPS coordinates, and if required for determining a corrected geographical zone corresponding to the object and for updating the object location database 326 by substituting the geographical zone stored in association with the object by the corrected geographical zone (see FIG. 18).

The GPS corrected coordinates database 334 and the object location database 326 are adapted to be accessible via a data network for purposes of use in a wide range of applications. In fact, there is a wide range of applications which require the geographical zone determination of moving or stationary objects as well as the determination of corrected GPS coordinates for these objects.

In an embodiment of the invention, the geographical zones correspond to parking zones defined by the traffic authorities. In an embodiment of the invention, the object is a vehicle, the geographical zone database 324 is a parking zone database and the object location database 326 is a vehicle location database.

In an embodiment of the invention, the GPS correction system 299 is adapted to be connected to the vehicle parking management device 2, wherein the object GPS coordinates and the object identification information are respectively the vehicle location and vehicle identification information received at the zone determination unit 322 as part of the parking notification transmitted by the vehicle parking management device 2.

In an embodiment of the invention, the object location database 326 and the GPS corrected coordinates database 334 are adapted to be connected to the parking payment system 99 for providing corrected GPS coordinates and corrected parking zones in association with the vehicles.

In an embodiment of the invention, the object location database 326 and the GPS corrected coordinates database 334 are adapted to be connected to the parking payment control system 199 for providing corrected GPS coordinates and corrected parking zones in association with the vehicles.

In an embodiment of the invention, the GPS correction system 299 is part of the parking payment system 99, wherein the zone determination unit 322 is the parking zone determination unit 102 and the geographical zone database 324 is the parking zone database 104.

In an embodiment of the invention, the GPS correction system 299 is part of the parking payment control system 199, wherein the zone determination unit 322 is the parking zone determination unit 202 and the geographical zone database 324 is the parking zone database 204.

Figure 19:
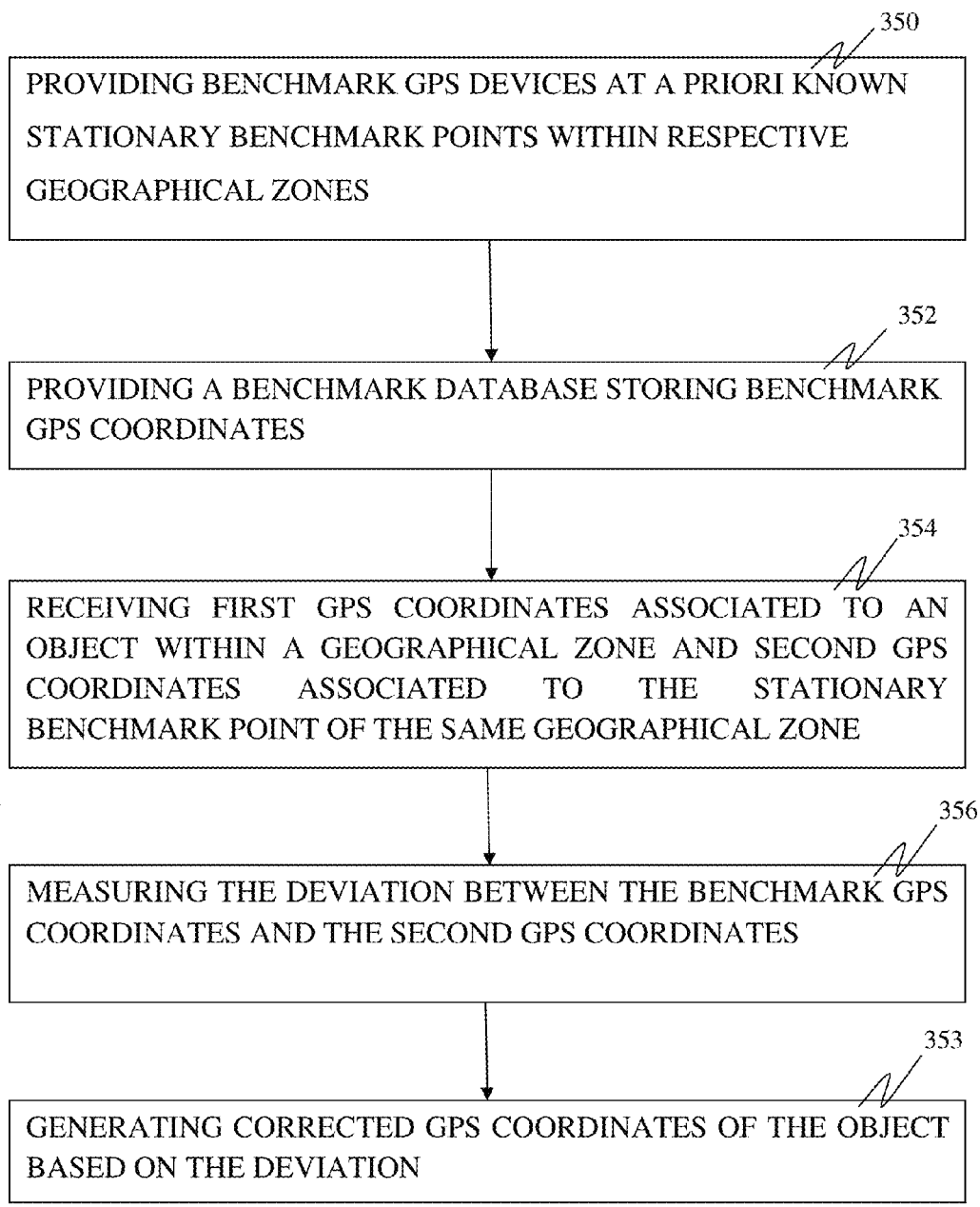
FIG. 19 illustrates a GPS correction method in accordance with an embodiment of the invention.

As a further aspect of the invention, there is provided a process for correcting GPS coordinates received in association with a stationary or moving object, the process comprises providing benchmark GPS devices at a priori known stationary benchmark points with respective geographical zones 350, proving a benchmark database storing the benchmark GPS coordinates 352, receiving first GPS coordinates associated to the object within a geographical zone and second GPS coordinates associated to the stationary benchmark point of the same geographical zone 354, measuring a GPS coordinates deviation between the benchmark GPS coordinates and the second GPS coordinates 356, and generating corrected GPS coordinates of the object based on GPS coordinates deviation (see FIG. 19).

Figure 20:
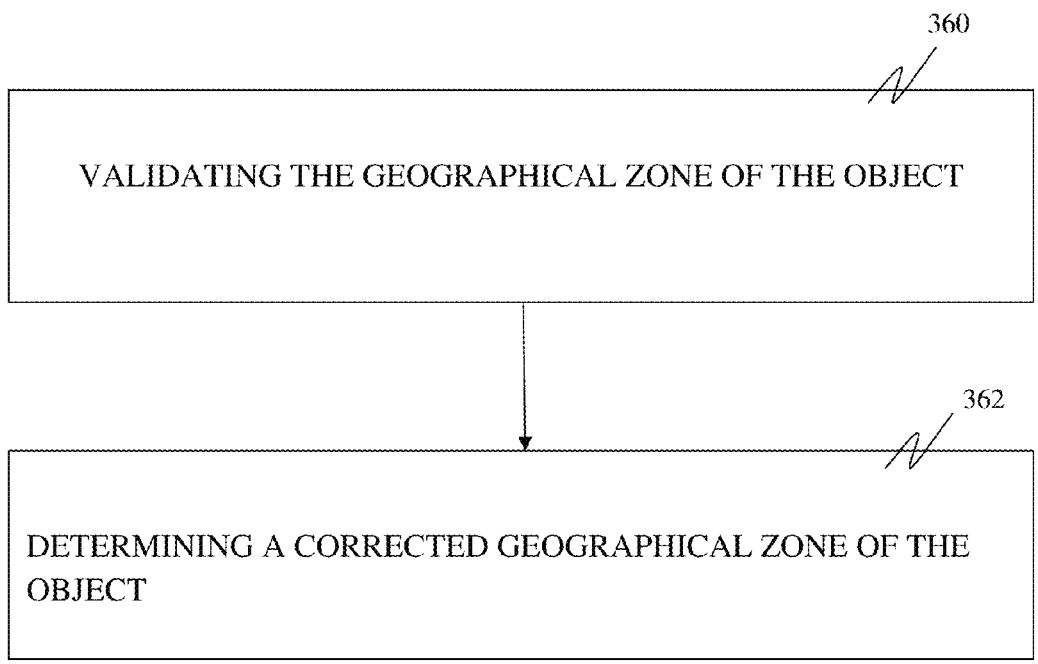
FIG. 20 illustrates the further steps of validation of the geographical zone as part of the GPS correction method in accordance with an embodiment of the invention.

In an embodiment of the invention, the process further comprises validating the geographical zone of the object using the GPS corrected coordinates 360, and if required determining a corrected geographical zone of the object 362 (see FIG. 20).

Parking Management System

Figure 21:
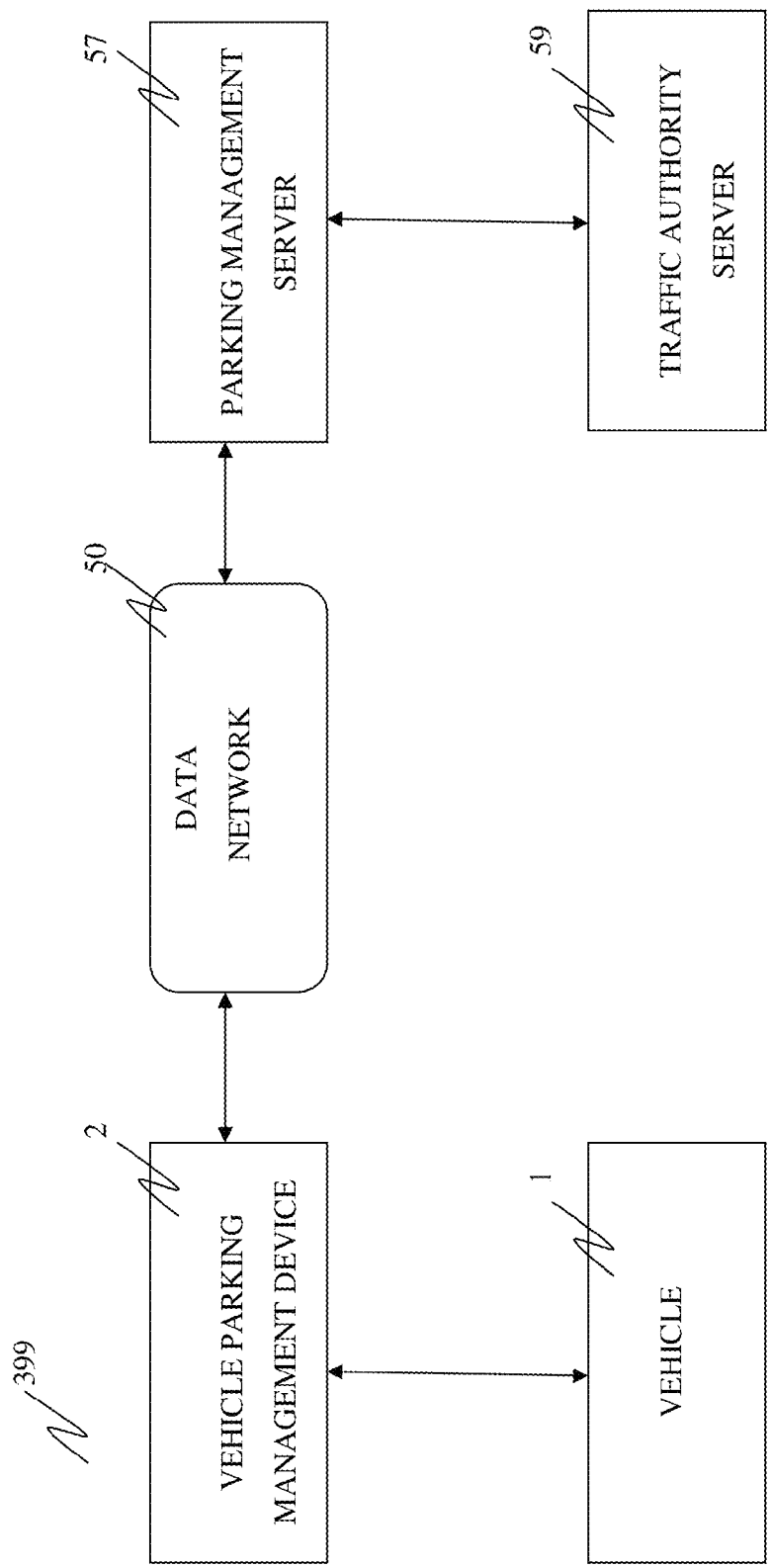
FIG. 21 illustrates a parking management system in accordance with an embodiment of the invention.

As an aspect of the invention, referring to FIG. 21, there is provided a parking management system 399 comprising a vehicle parking management device 2 adapted to be mounted at a vehicle 1 having a vehicle identifier for detecting a parking position of the vehicle, determining the location of the vehicle, and generating and transmitting via a wireless data network 50 a parking notification comprising the vehicle location and the vehicle identifier when the vehicle is in a parking position; and a parking management server 57 adapted to be connected to the vehicle parking management device 2 via the wireless data network 50 for receiving the parking notification, determining a parking zone of the vehicle 1 based on the vehicle location, determining a parking tariff based on the parking zone, and for paying the parking tariff or issuing a fine in association with the vehicle 1 if the parking tariff is determined not to be paid.

In an embodiment of the invention, as illustrated in FIG. 22, the vehicle location is a GPS location, and the system further comprises a GPS benchmark device 300 located at a benchmark point within the parking zone, the benchmark point having a priori known benchmark GPS location stored at the parking management server 57, the parking management server 57 being further adapted for receiving a real time GPS location from the GPS benchmark device 300 at the time of determining the parking zone, for determining a deviation value between the benchmark GPS location and the real time GPS location, and for correcting the GPS location of the vehicle based on the determined deviation value. The real time GPS location can also mean at a time sufficiently close to the time of determining the parking zone (for example within a 1 hour period).

In an embodiment of the invention, the parking management server 57 is further adapted to validate and correct the parking zone and the parking tariff based on the corrected GPS location of the vehicle 1. This is done by re-determining the geographical zone based on the corrected GPS location.

In an embodiment of the invention, the parking management server 57 is adapted to communicate with a user associated with the vehicle for transmitting an electronic parking payment notification or an electronic fine notification.

In an embodiment of the invention, the vehicle parking management device 2 is an automated device adapted to operate without human interaction.

In an embodiment of the invention, the vehicle parking management device 2 is adapted to receive the electronic parking payment notification or the electronic fine notification and communicating thereof to the user.

In an embodiment of the invention, the parking management server 57 is adapted to be connected to a traffic authority server 5 comprising a parking zone database 204, a parking tariff database 208, a parking payment database 212 for the determination of the parking zone, the parking tariff and the parking payment status, and for the storage of data with respect to the parking payment made or fine issued.

In an embodiment of the invention, the traffic authority server 5 further comprises a financial information database 220 storing financial information in association with the vehicle 1 for use for the purpose of paying the parking tariff or paying the fine.

In an embodiment of the invention, the vehicle parking management device 2 stores financial information in association with the vehicle 1 and the parking notification further comprises said financial information, the parking management server 57 further adapted to use the financial information for the purpose of paying the parking tariff or paying the fine.

In an embodiment of the invention, the vehicle parking management device 2 stores contact information allowing for communicating with the user and the parking notification comprises the contact information, the parking management server 57 being further adapted to send the electronic payment notification or the electronic fine notification to the user using said contact information.

In an embodiment of the invention, the contact information comprises a mobile device identifier associated with the user.

In an embodiment of the invention, the vehicle parking management device 2 comprises a SIM module/chip 30 having a SIM module/chip identifier used as the vehicle identifier, the parking notification being sent to the parking management server 57 using the SIM module/chip 30.

In an embodiment of the invention, the vehicle parking management device 2 detects the parking position by detecting at least one of a stationary position and a power off status of the vehicle.

In an embodiment of the invention, the stationary position is detected using at least one of an accelerator detector and gyroscope.

In an embodiment of the invention, the vehicle parking management device 2 further comprises a user interface 15 for communicating with the user, the user interface 15 comprising a screen for displaying the electronic payment notification or electronic fine to the user.

In an embodiment of the invention, the vehicle parking management device 2 further comprises an information storage unit 16, such as a memory 26, for storing data records of electronic parking payment notifications and electronic fines received from the parking management server 57, the information storage unit 16 being readable by the device 2 for displaying said records to the user using the screen.

In an embodiment of the invention, the user interface 15 is adapted to enable the user to manually affect the payment of the parking tariff or the fine by specifying the financial information or approving the use of the financial information stored in the device 2 for the purpose of the payment.

In an embodiment of the invention, the user interface 15 is adapted to enable the user to post a complaint in association with a fine issued, the vehicle parking management device 2 being adapted to transmit the complaint to the server 57, and the server 57 being adapted to transmit the complaint to the traffic authority server.

The server 57 and traffic authority server 59 can be the same server or separate servers. In an embodiment of the invention, the parking management server 57 comprises at least one of the parking payment system 199 and the parking payment control system 299 or any part thereof.

Figure 23A:
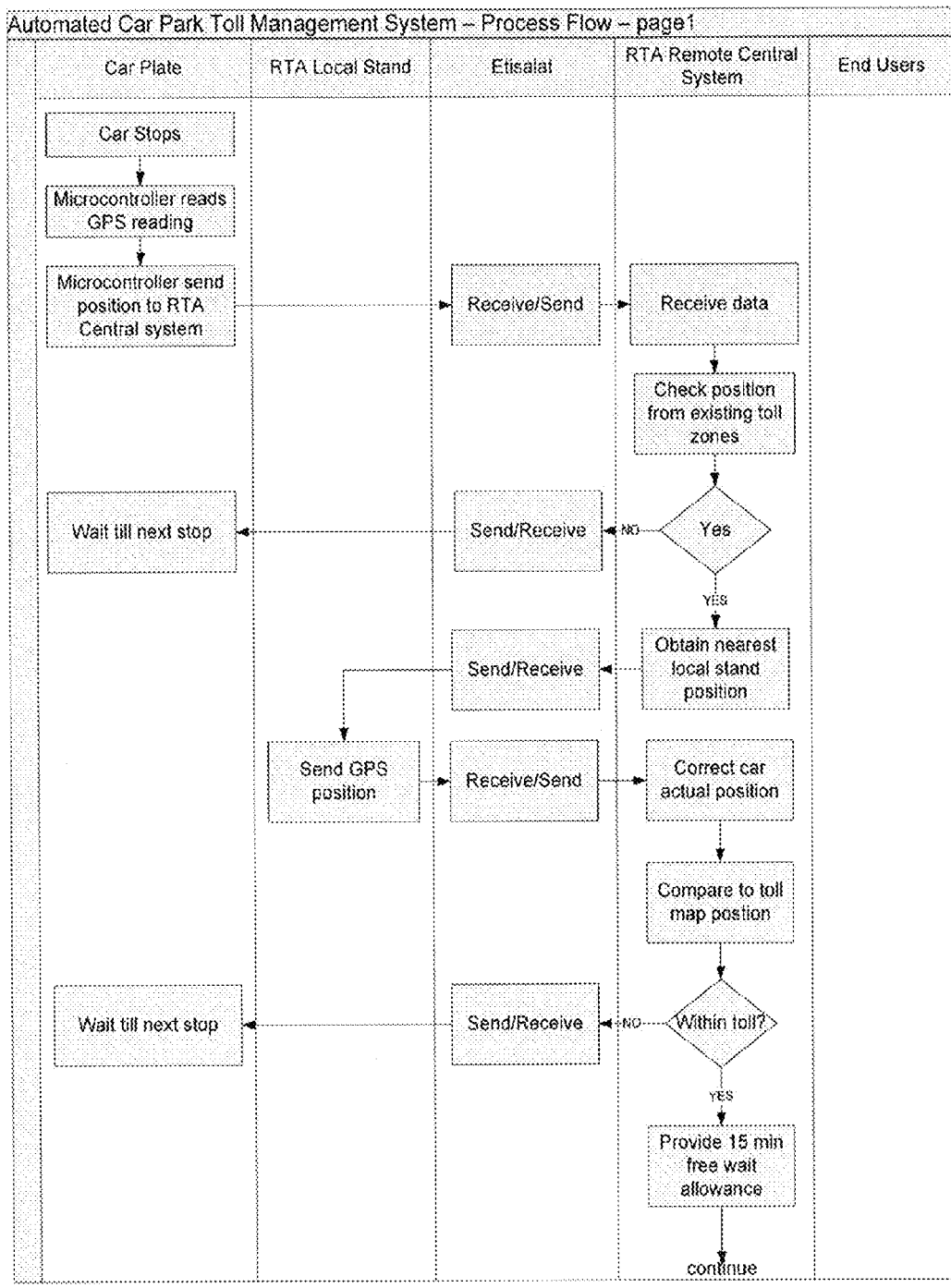
FIGS. 23 A and B illustrate a parking management process in accordance with an embodiment of the invention.
Figure 23B:
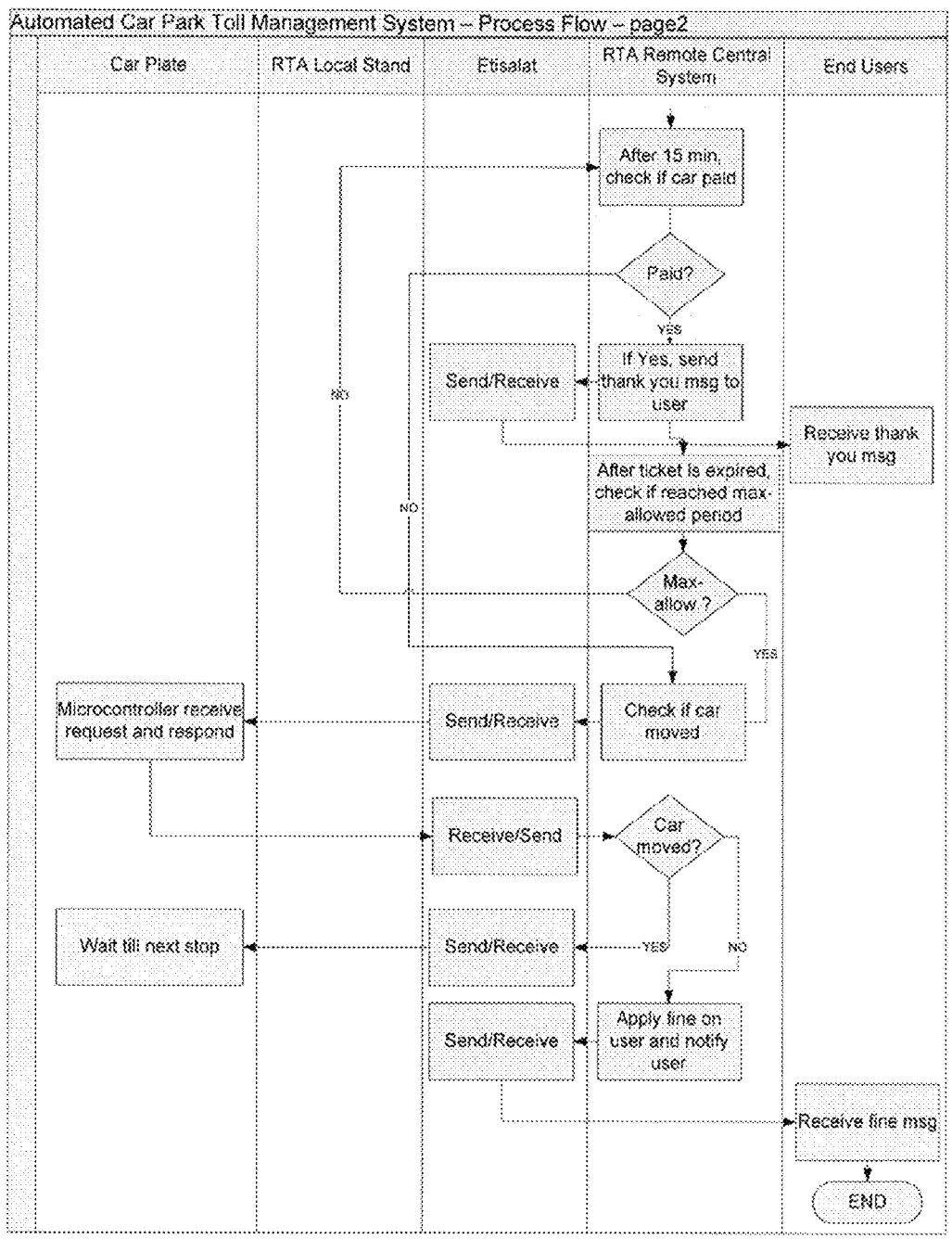

As a further aspect of the invention, as illustrated in FIGS. 23 A and B, there is provided a parking management process for detecting a parking position of the vehicle, determining the location of the vehicle, and generating and transmitting via a wireless data network 50 a parking notification comprising the vehicle location and the vehicle identifier when the vehicle is in a parking position; and a parking management server 57 adapted to be connected to the vehicle parking management device 2 via the wireless data network 50 for receiving the parking notification, determining a parking zone of the vehicle 1 based on the vehicle location, determining a parking tariff based on the parking zone, and for paying the parking tariff or issuing a fine in association with the vehicle 1 if the parking tariff is determined not to be paid. The process uses a GPS benchmark device 300 located at a benchmark point within the parking zone, the benchmark point having a priori known benchmark GPS location stored at the parking management server 57, the parking management server 57 being further adapted for receiving a real time GPS location from the GPS benchmark device 300 at the time of determining the parking zone, for determining a deviation value between the benchmark GPS location and the real time GPS location, and for correcting the GPS location of the vehicle based on the determined deviation value. The example illustrated in FIGS. 23 A and B uses the vehicle plate number as the vehicle identifier, the Roads and Transport Authority (RTA) local stand as benchmark point, Etisalat as the network service provider, and the RTA remote central system as the parking management server 57 and the traffic authority server 59.

Vehicle Equipment with an Automated Parking Management Device

Figure 24:
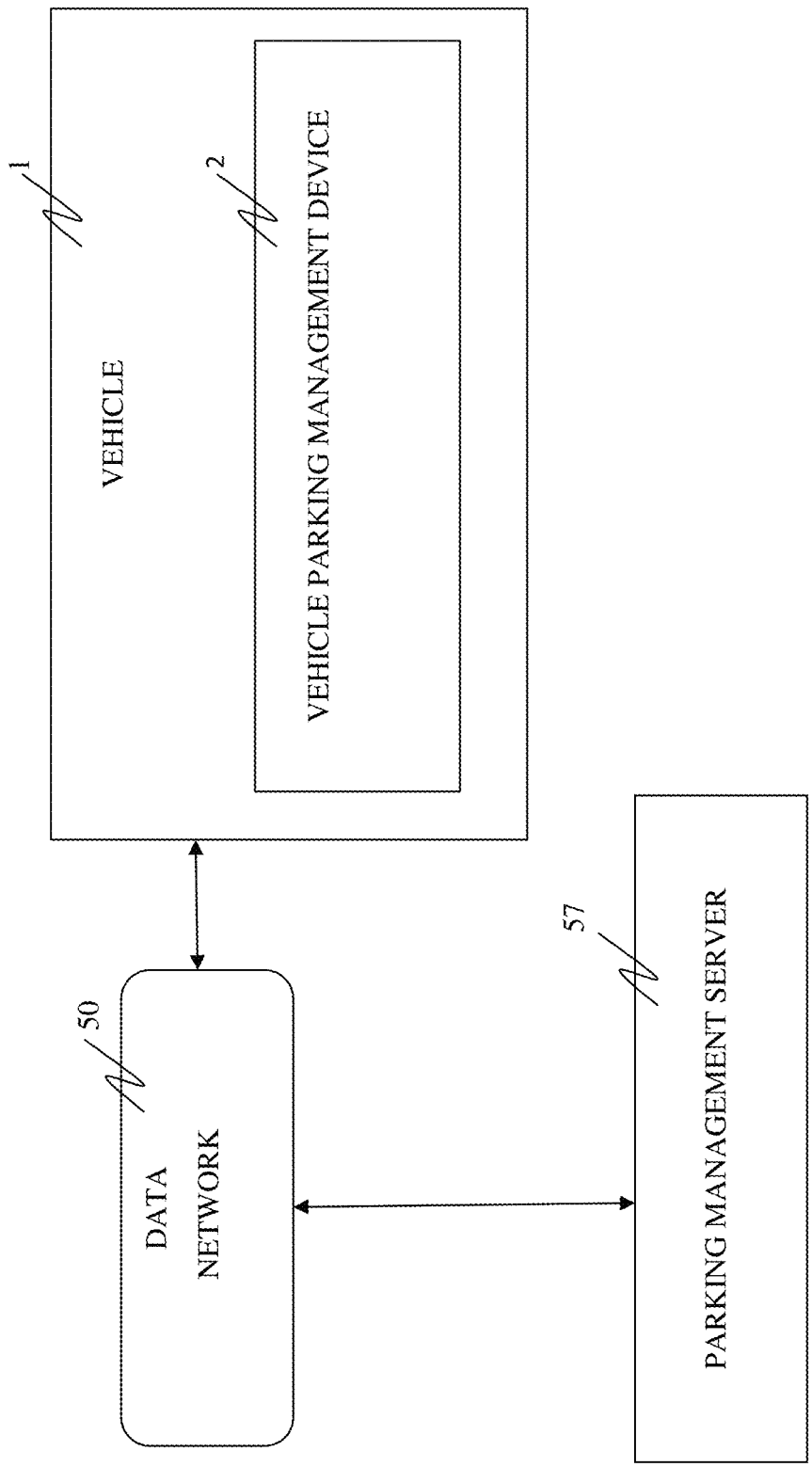
FIG. 24 illustrates a vehicle adapted to use a vehicle parking management device in remote connection with a parking management server in accordance with an embodiment of the invention.

As a further aspect of the invention, as illustrated in FIG. 24, there is provided a vehicle comprising a vehicle parking management device 2 adapted to be mounted at a vehicle 5 having a vehicle identifier for detecting a parking position of the vehicle, determining the location of the vehicle, and generating and transmitting to a remote parking management server 57 via a wireless data network 50 a parking notification comprising the vehicle location and the vehicle identifier when the vehicle is in a parking position for purpose of paying a parking tariff or controlling the payment of the parking tariff by the traffic authorities.

In an embodiment of the invention, the parking management server 57 comprises at least one of the parking payment system 99, the parking payment control system 199, the GPS correction system 299, and the parking management system 399 and/or any part thereof.

Although the above description of the present invention has disclosed the features of the invention as applied to the preferred embodiment; additions, omissions and modifications applied to the details of the embodiment illustrated may be made by those skilled in the art without departing from the essential characteristic of the present invention.

Although the invention has been explained in relation to its preferred embodiment, it is to be understood that many other possible modifications and variations can be made without departing from the spirit and scope of the invention as herein described.

The invention claimed is:

1. A GPS correction system comprising:
benchmark GPS devices located at a priori known stationary benchmark points within respective geographical zones, the stationary benchmark points having corresponding respective benchmark GPS coordinates;
a benchmark database adapted for storing the benchmark GPS coordinates;
a GPS deviation determination unit adapted to be connected to a data network for:
receiving first GPS coordinates associated with an object having a GPS device within a geographical zone and second GPS coordinates associated with a stationary benchmark point, the first and second GPS coordinates being measured at a same time period and transmitted respectively by the benchmark GPS device and the GPS device of the object; and
measuring a GPS coordinates deviation between the benchmark GPS coordinates and the second GPS coordinates;
a GPS coordinates deviation database connected the GPS deviation determination unit for storing the GPS coordinates deviation;
a GPS correction unit adapted to be connected to the GPS coordinates deviation database for generating corrected GPS coordinates of the object by using the measured GPS coordinates deviation;
wherein the deviation is measured by determining a deviation in latitude coordinates and a deviation in longitude coordinates respectively between latitude coordinates and longitude coordinates of the benchmark GPS coordinates and the second GPS coordinates, and
wherein the deviation in the latitude coordinates and the deviation in the longitude coordinates are used respectively to correct the latitude coordinates and the longitude coordinates of the first GPS coordinates associated with the object; and a zone determination unit and a geographical zones database comprising data mapping GPS coordinates to respective geographical zones, each geographical zone being associated with at least one respective a priori known stationary benchmark, the zone determination unit being connected to the geographical zones database and to a communication unit for receiving the first GPS coordinates and for determining a geographical zone of the object based on the first GPS coordinates.

2. The GPS correction system as claimed in claim 1 further comprising an object location database for storing data mapping an object identifier to the geographical zone.

3. The GPS correction system as claimed in claim 2 further comprising a zone validation unit connected to the zone determination unit, to the GPS correction unit and to the geographical zones databases, the zone validation unit receiving the corrected GPS coordinates of the object and validating the geographical zone based on the corrected GPS coordinates, and if it is required, the zone validation unit determining a corrected geographical zone by inquiring the geographical zones database using the corrected GPS coordinates and updating the object location database by substituting the geographical zone by the corrected geographical zone.

4. The GPS correction system as claimed in claim 3 wherein the object is a vehicle, the geographical zone is a parking zone, the object location database is a vehicle location database and the object identifier is vehicle identification information.

5. The GPS correction system as claimed in claim 4 wherein the first GPS coordinates of the vehicle are received by the communication unit as part of a parking notification associated to the vehicle further comprising the vehicle identification information.

6. The GPS correction system as claimed in claim 1 wherein the data network comprises a satellite network.

7. A GPS correction method comprising:
providing benchmark GPS devices located respectively at a priori known stationary benchmark points within respective geographical zones, the stationary benchmark points having corresponding benchmark GPS coordinates;
providing a benchmark database storing data mapping the GPS devices to the benchmark GPS coordinates of their respective stationary benchmark points and their respective geographical zones;
receiving first GPS coordinates associated with objects within the geographical zones and second GPS coordinates associated to the stationary benchmark points measured at a same time period, the first GPS coordinates being transmitted by benchmark GPS devices and the second GPS coordinates being transmitted by GPS devices associated with the objects;
generating corrected GPS coordinates of the object by measuring a deviation between the benchmark GPS coordinates and the second GPS coordinates and using the deviation for correcting the first GPS coordinates,
wherein the deviation is measured by determining a deviation in latitude coordinates and a deviation in longitude coordinates respectively between latitude coordinates and longitude coordinates of the benchmark GPS coordinates and the second GPS coordinates, and
wherein the deviation in the latitude coordinates and the deviation in the longitude coordinates are used respectively to correct the latitude coordinates and the longitude coordinates of the first GPS coordinates associated to the object; and providing a geographical zones database comprising data mapping GPS coordinates to geographical zones, and determining the geographical zone based on the first GPS coordinates.

8. The GPS correction method as claimed in claim 7, further comprising storing data, which maps an object identifier to the geographical zone, in an object location database.

9. The GPS correction method as claimed in claim 8 further comprising validating the geographical zone based on the corrected GPS coordinates, and if it is required, determining a corrected geographical zone by inquiring the geographical zones database using the corrected GPS coordinates and updating the object location database by substituting the geographical zone by the corrected geographical zone.

10. The GPS correction method as claimed in claim 9 wherein the object is a vehicle, the geographical zone is a parking zone, the object location database is a vehicle location database and the object identifier is vehicle identification information.

11. The GPS correction method as claimed in claim 10 wherein the first GPS coordinates of the vehicle are received as part of a parking notification associated to the vehicle further comprising the vehicle identification information.

12. The GPS correction method as claimed in claim 7 wherein the data network comprises a satellite network.

* * * * *